US011341614B1

(12) United States Patent
Chen et al.

(10) Patent No.: US 11,341,614 B1
(45) Date of Patent: May 24, 2022

(54) EMIRROR ADAPTABLE STITCHING

(71) Applicant: Ambarella International LP

(72) Inventors: I-Husan Chen, New Taipei (TW);
Hung Ling Lu, New Taipei (TW);
Yen-Yu Chen, Taipei (TW)

(73) Assignee: Ambarella International LP, Santa Clara, CA (US)

( * ) Notice: Subject to any disclaimer, the term of this patent is extended or adjusted under 35 U.S.C. 154(b) by 176 days.

(21) Appl. No.: 16/580,222

(22) Filed: Sep. 24, 2019

(51) Int. Cl.
*G06T 5/00* (2006.01)
*G06T 3/40* (2006.01)
*G06T 7/50* (2017.01)
*G06T 7/73* (2017.01)
*B60R 1/00* (2022.01)
*B60R 1/12* (2006.01)

(52) U.S. Cl.
CPC ............... *G06T 5/002* (2013.01); *B60R 1/00* (2013.01); *B60R 1/12* (2013.01); *G06T 3/4038* (2013.01); *G06T 7/50* (2017.01); *G06T 7/73* (2017.01); *B60R 2001/1215* (2013.01); *B60R 2300/105* (2013.01); *B60R 2300/303* (2013.01); *B60R 2300/8066* (2013.01); *G06T 2207/10012* (2013.01); *G06T 2207/10016* (2013.01); *G06T 2207/30252* (2013.01)

(58) Field of Classification Search
CPC ..... B60R 1/00; B60R 1/12; B60R 2001/1215; B60R 2300/105; B60R 2300/303; B60R 2300/8066; G06T 3/4038; G06T 5/002; G06T 7/50; G06T 7/73; G06T 2207/10016; G06T 2207/30252
See application file for complete search history.

(56) References Cited

U.S. PATENT DOCUMENTS

| 9,723,272 | B2* | 8/2017 | Lu | G06T 7/80 |
| 10,345,822 | B1* | 7/2019 | Parchami | G05D 1/0088 |
| 11,004,225 | B2* | 5/2021 | Harmsen | G05D 1/0094 |
| 2017/0177937 | A1* | 6/2017 | Harmsen | G06K 9/00624 |

(Continued)

OTHER PUBLICATIONS

Cao et al. "Estimating depth from monocular images as classification using deep fully convolutional residual networks." IEEE Transactions on Circuits and Systems for Video Technology 28.11 (2017): 3174-3182. (Year: 2017).*

(Continued)

*Primary Examiner* — Katrina R Fujita
(74) *Attorney, Agent, or Firm* — Christopher P. Maiorana, PC

(57) ABSTRACT

An apparatus including an interface and a processor. The interface may be configured to receive video frames generated by a plurality of capture devices. The processor may be configured to perform operations to detect objects in the video frames received from a first of the capture devices, determine depth information corresponding to the objects detected, determine blending lines in response to the depth information, perform video stitching operations on the video frames from the capture devices based on the blending lines and generate panoramic video frames in response to the video stitching operations. The blending lines may correspond to gaps in a field of view of the panoramic video frames. The blending lines may be determined to prevent the objects from being in the gaps in the field of view. The panoramic video frames may be generated to fit a size of a display.

20 Claims, 17 Drawing Sheets

(56) References Cited

U.S. PATENT DOCUMENTS

| | | | |
|---|---|---|---|
| 2019/0004533 A1* | 1/2019 | Huang | G06K 9/4628 |
| 2019/0291642 A1* | 9/2019 | Chae | B60R 1/00 |
| 2020/0019794 A1* | 1/2020 | Engelcke | G06N 3/0454 |
| 2020/0090359 A1* | 3/2020 | Pillai | G06T 7/593 |
| 2020/0267332 A1* | 8/2020 | van den Brink | G06T 3/4038 |

OTHER PUBLICATIONS

De La Garanderie et al. "Eliminating the blind spot: Adapting 3d object detection and monocular depth estimation to 360 panoramic imagery." Proceedings of the European Conference on Computer Vision (ECCV). 2018. (Year: 2018).*

Boerlu, "BMW i8 shows Mirrorless Camera Technology", 2016, pp. 1-5.

Jonas Uhrig et al., "Sparsity Invariant CNNs", Inernational Conference on 3D Vision (3DB), 2017, pp. 1-4.

* cited by examiner

EMIRROR ADAPTABLE STITCHING

FIELD OF THE INVENTION

The invention relates to video capture devices generally and, more particularly, to a method and/or apparatus for implementing emirror adaptable stitching.

BACKGROUND

Modern vehicles are designed to have advanced technology. The advanced technology includes various assistance systems to help the driver (i.e., navigational aids, collision warnings, computer-assisted driving, etc.). One assistance system is an electronic mirror (E-mirror). E-mirrors display video captured from vehicle-mounted cameras to provide a view similar to a conventional reflective rear-view mirror. E-mirrors improve on reflective mirrors by providing details of areas that a reflective mirror might not be able to show.

One type of e-mirror design is a 3-in-1 display. The 3-in-1 display e-mirror provides a single display that shows views similar to what a driver would see when looking at each of the conventional reflective side view mirrors and rear view mirror (i.e., combine left, back and right camera image to one image). Due to differences in locations of cameras, the image stitching that combines the 3 separate video feeds into a single video frame results in blending lines. Blending lines reduce visual artifacts caused by stitching (i.e., double images). However, the blending lines can also cause objects to be missing in the output video frame (e.g., portions of each video frame are cropped out to provide a more consistent view).

To prevent missing objects conventional camera systems find features and match the two images. Some conventional solutions use two cameras depth (i.e., measured using both the center and side camera) to calculate a position of an obstacle with respect to a 3D axis, and combine two image to one image. Some conventional solutions use stereo images to calculate obstacle position, and recalculate the obstacle position in both the center and side camera image. Using stereo images can get the same obstacle that is in two images and stitch the two images to prevent the double obstacle issue. However using stereo images is expensive in terms of computational resources and can take a lot of time to get the correct 3-D position for two camera. Since presenting images to an e-mirror is time-sensitive, a stereo camera solution to finding depth information does not solve the problem.

It would be desirable to implement emirror adaptable stitching.

SUMMARY

The invention concerns an apparatus including an interface and a processor. The interface may be configured to receive video frames corresponding to an exterior view of a vehicle generated by a plurality of capture devices. The processor may be configured to perform operations to detect objects in the video frames received from a first of the plurality of capture devices, determine depth information corresponding to the objects detected in the video frames from the first of the plurality of capture devices, determine blending lines in response to the depth information, perform video stitching operations on the video frames from the plurality of capture devices based on the blending lines and generate panoramic video frames in response to the video stitching operations. The blending lines may correspond to gaps in a field of view of the panoramic video frames. The blending lines may be determined to prevent the objects from being in the gaps in the field of view. The panoramic video frames may be generated to fit a size of a display.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
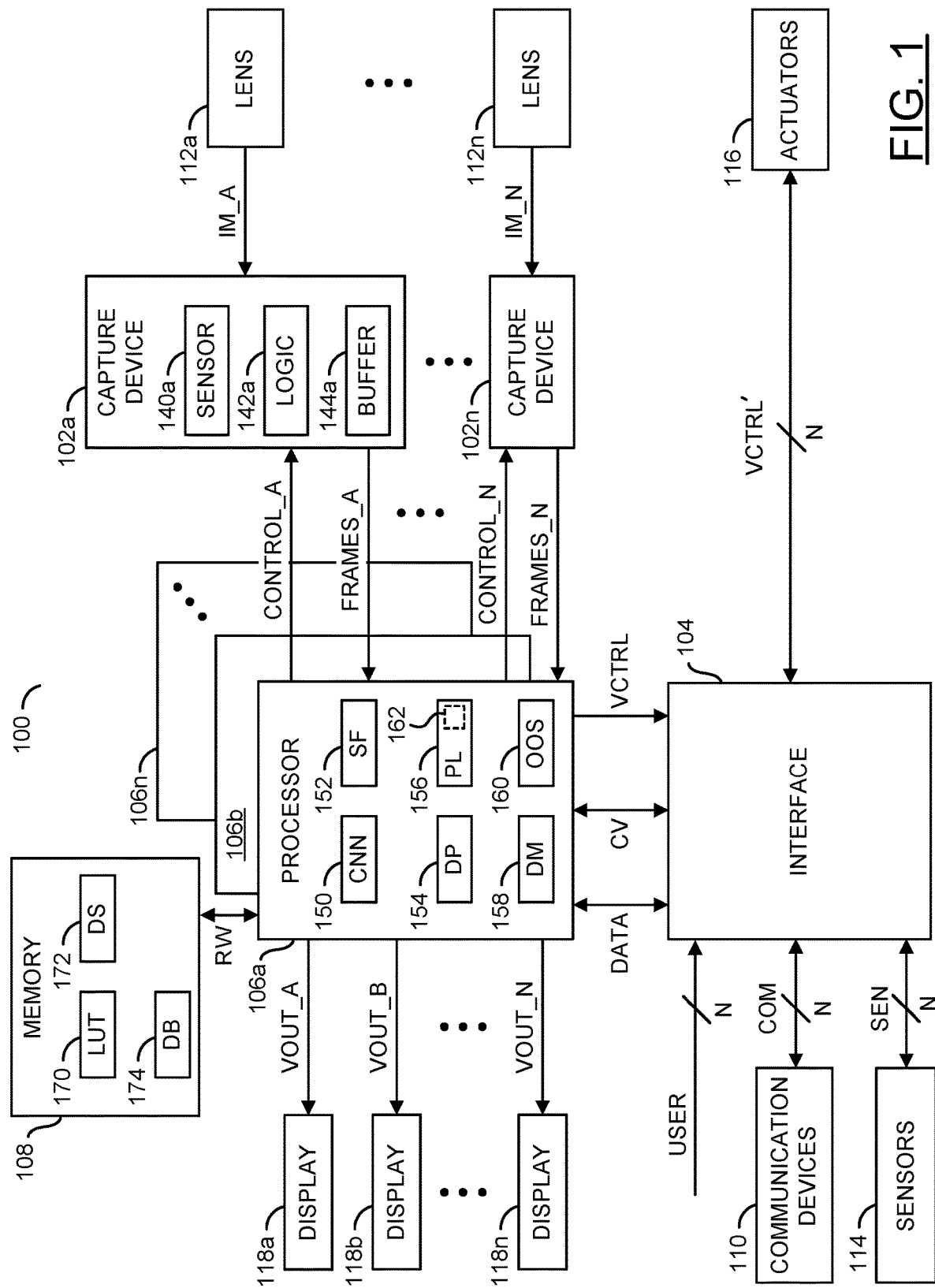
FIG. 1 is a diagram illustrating an embodiment of the present invention.

Embodiments of the present invention include providing emirror adaptable stitching that may (i) adjust the location of blending lines, (ii) determine distance based on analysis of video from a single camera, (iii) adjust blending lines to prevent missing objects in the output video, (iv) generate video data for a 3-in-1 emirror display, (v) adjust the shape of a blending line, and/or (vi) be implemented as one or more integrated circuits.

Embodiments of the present invention may be configured to determine an obstacle position and/or distance in a single image. The position and/or distance may be used to perform video stitching operations. Using a position and/or distance determined using an image from a single camera may enable the invention to prevent missing objects (e.g., objects that are present and captured in the images that are stitched, but cropped out of the output image) in the output stitched video frame.

Embodiments of the present invention may be configured to output video data to a 3-in-1 emirror display. A convolutional neural network (CNN) may be implemented to train the invention to determine a monocular depth of an object. The monocular depth may be a distance measured using a single video frame captured from one back/camera (e.g., instead of using stereo camera pairs to determine a stereoscopic distance). In an example, one video frame from a center camera (e.g., the rear center view of a 3-in-1 emirror) may be analyzed to determine the distance of an object (e.g., a car located behind an ego vehicle). Based on the distance and/or position of the detected object, if the location of the object corresponds to the blending lines of an output panoramic video frame (e.g., a stitched video frame) the location of the blending lines may be adjusted. In one example, the blending lines may be adjusted to enable the object to be visible (e.g., not cropped out) in the output panoramic video frame (e.g., at least partially visible). In another example, the blending lines may be adjusted to enable the object to be complete in the output panoramic video frame (e.g., fully visible)

The raw image captured by the rear center camera may comprise more video data than is output in the stitched video frame (e.g., portions of the video data in the raw image may be cropped out when multiple video frames are stitched together). The blending lines may correspond to the portions of the raw image that are cropped out. If the object would be missing from the output panoramic video frames (e.g., corresponds to the default location of the blending lines), and the object is present in the raw image, then embodiments of the present invention may be configured to adjust the location of the blending line to show the obstacle in the output panoramic image.

Embodiments of the present invention may be configured to use the adaptable stitching line(s) to determine where to perform the stitching according to the distance of the detected objects. The stitching lines may be adjusted even if two or more objects are detected at the same time. The adjusted stitching lines may be straight lines and/or curved lines.

Generally, determining a depth based on a monocular view may not provide a very accurate depth measurement. However, the monocular depth measurement may be sufficient to determine whether the detected objects have a depth and/or position that corresponds to the gaps (e.g., the missing range corresponding to the blending lines in the stitched output video frame) and would not be visible in the output stitched video frame unless the blending lines are adjusted. Embodiments of the present invention may be configured to determine whether the object(s) are in the gaps and determine a position based on the center image alone. If the object is in the missing range (e.g., the gaps), the orientation of the blending lines may be adjusted.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 5.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162. The circuit 162 may implement a computer vision pipeline portion. The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
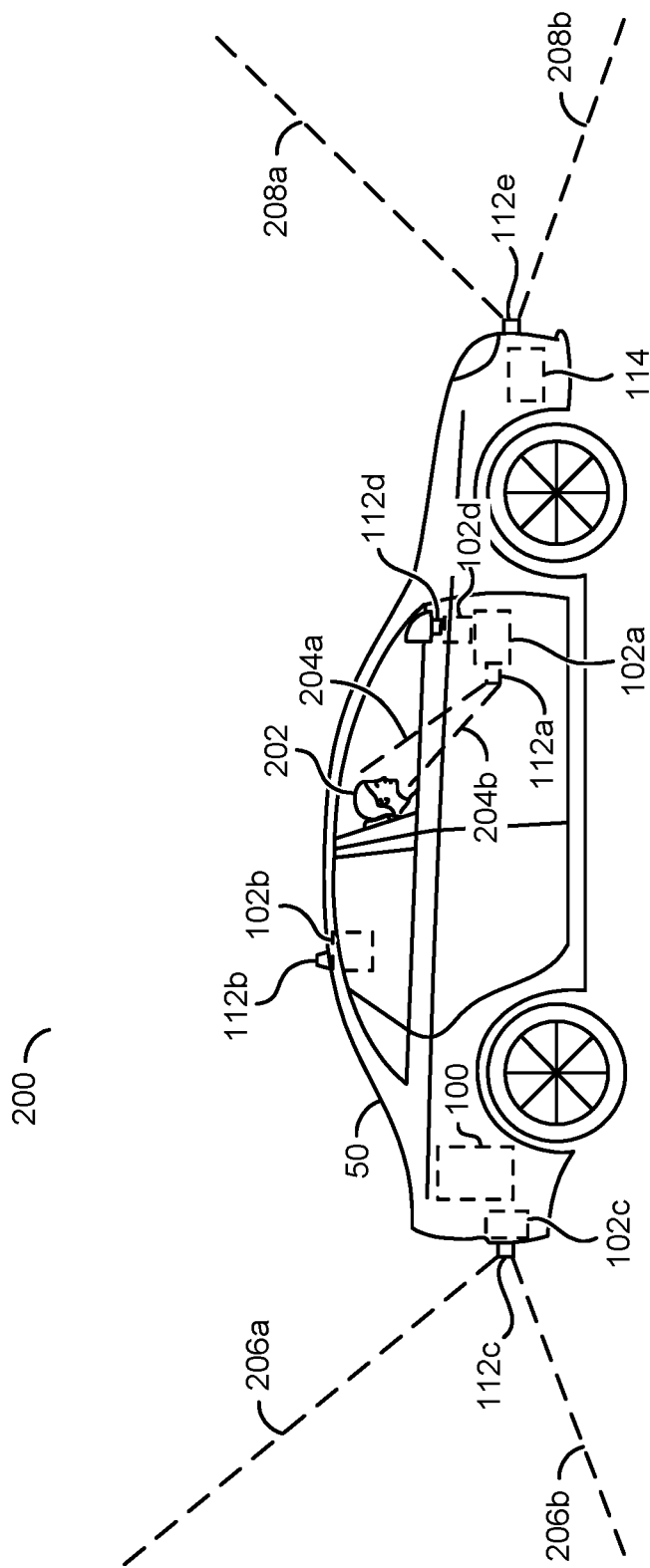
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultrasound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50' was parked, when the ego vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
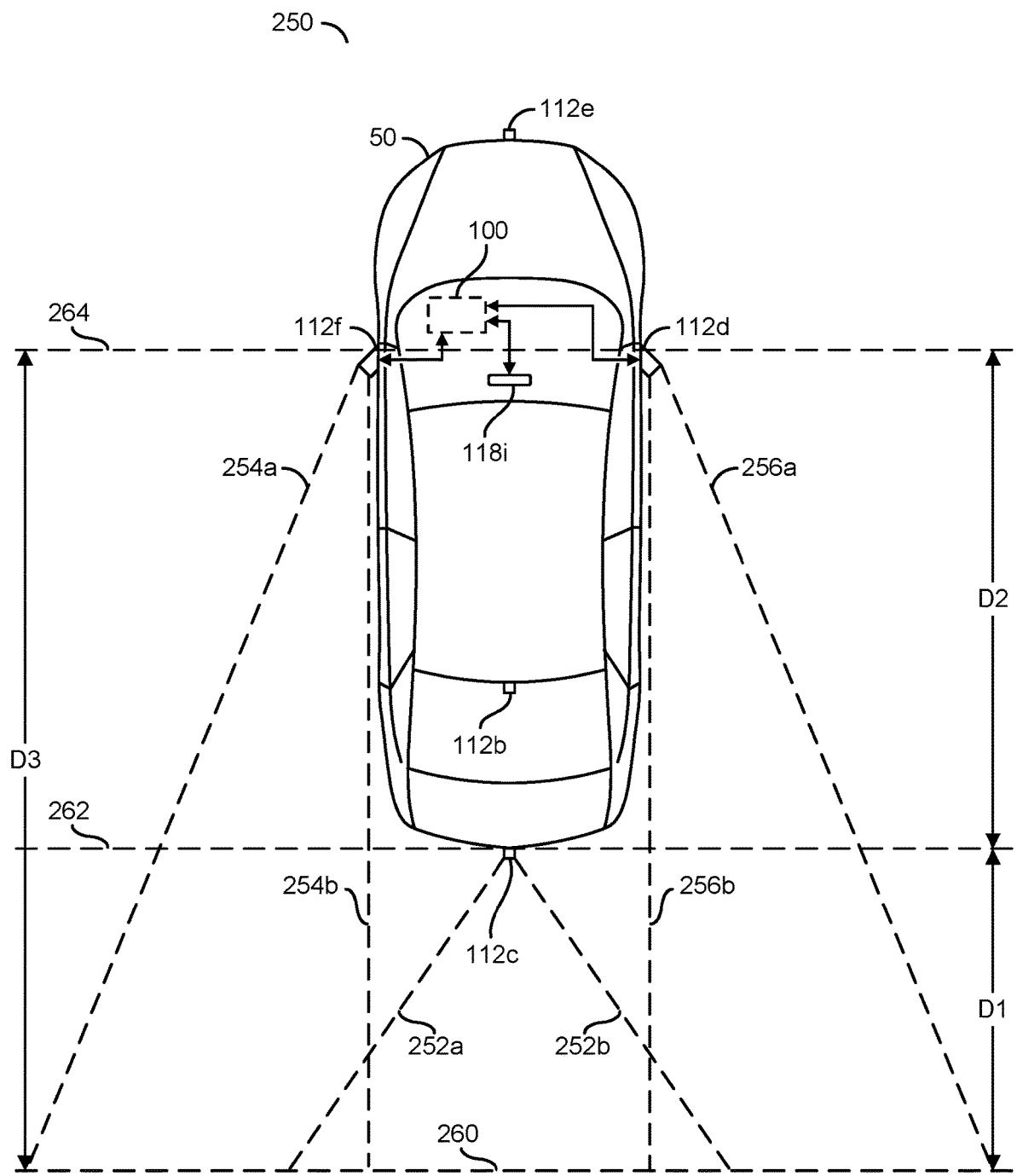
FIG. 3 is a diagram illustrating distances between side mounted cameras and a rear camera.

Referring to FIG. 3, a diagram illustrating distances between side mounted cameras and a rear camera are shown. An overhead view 250 of the ego vehicle 50 is shown. The apparatus 100 and the display 118i are shown within the ego vehicle 50. The lenses 112b-112f are shown located on the outside body of the ego vehicle 50. In the example shown, the lens 112c may capture video data from a rear center (e.g., bumper) of the ego vehicle 50, the lens 112d may capture video data from a passenger side of the ego vehicle 50 and the lens 112f may capture video data from a driver side of the ego vehicle 50.

Lines 252a-252b are shown extending from the lens 112c. The lines 252a-252b may represent a field of view of the rear camera lens 112c. Lines 254a-254b are shown extending from the lens 112f. The lines 254a-254b may represent a field of view of the driver side camera lens 112f. Lines 256a-256b are shown extending from the lens 112d. The lines 256a-256b may represent a field of view of the passenger side camera lens 112d. The field of view lines 252a-252b, 254a-254b and/or 256a-256b are shown for illustrative purposes. For example, the field of view lines 252a-252b, 254a-254b and/or 256a-256b may extend from the lenses 112c, 112d and/or 112f at a wider angle (e.g., the lenses 112c, 112d and/or 112f may be wide angle lenses). The arrangement of the lens 112c, the lens 112d and/or the lens 112f and/or the field of view 252a-252b, the field of view 254a-254b and/or the field of view 256a-256b may be varied according to the design criteria of a particular implementation.

A line 260 is shown. The line 260 may be a reference location. The reference location 260 is shown behind the ego vehicle 50. A line 262 is shown. The line 262 may be a reference location corresponding to the rear lens 112c. A line 264 is shown. The line 264 may be a reference location corresponding to the passenger side lens 112d and/or the driver side lens 112f.

A distance D1 is shown. The distance D1 may be a distance between the reference location 260 and the reference location 262. A distance D2 is shown. The distance D2 may be a distance between the reference location 262 and the reference location 264. A distance D3 is shown. The distance D3 may be a distance between the reference location 260 and the reference location 264. In the example shown, the distance D1 may be shorter than the distance D3. In an example, there may be approximately a three meter distance between the location of the passenger/driver lenses (e.g., 112d and 112f) and the rear lens 112c. For example, the distance D2 may be approximately three meters.

In an example, the rear capture device 102c (e.g., corresponding to the rear lens 112c), the passenger capture device 102d (e.g., corresponding to the passenger lens 112d) and the driver capture device 102f (e.g., corresponding to the driver lens 112f) may each have the same focal length. In an example, the focal length may be 4.6 mm. If an object located at the reference location 260 is captured by the rear lens 112c, the passenger lens 112d and the driver lens 112f, the object may appear different sizes in the captured video frames because of the distance D2 between the lenses.

One example method to achieve having an object at the reference location 260 appear to be the same size across all camera views, the rectilinear video frames captured by the rear camera 102c may be scaled down. In some embodiments, the processors 106a-106n (e.g., by performing video operations in the video pipeline 156) may scale down the rectilinear video frames (e.g., FRAMES_C) captured by the rear capture device 102c in order to make objects that appear across the different camera views (e.g., at a stitching seam) appear to have similar sizes. Generally, for objects that are far away, the size difference may not be noticeable even without scaling. When objects are close to the lenses 112c, 112d and 112f, then the size difference may be more apparent. Scaling the rectilinear video frames down so that objects have a similar size between different camera views may be desirable in the sense that an object moving across camera views in the 3-in-1 stitched display would be visually disorienting to the driver 202 if there is a large discontinuous change in size of the object moving across the stitching seam. However, the down-scaling of the rectilinear video frames captured by the rear camera 102c has a consequence of a large 'invalid' adjacent area at the top and/or bottom of the reduced-sized rear camera image (e.g., caused by the scaled down rectilinear video frames from the rear capture device 102c having a smaller size than the other capture devices 102d and 102f).

In some embodiments, a wider-angle (e.g., shorter focal length) rear camera lens 112c may be selected that is different than the side camera lenses (e.g., 112d and 112f). The shorter focal length rear camera lens 112c may be used to effectively perform the rear camera image size reduction. Selecting the shorter focal length for the rear camera lens 112c may result in the down-scaling of the video frames captured by the rear camera 102c in an optical manner rather than as a digital image resizing operation performed by the processors 106a-106n. However, whether the down-scaling is performed digitally or optically, the same 'invalid' area may result (e.g., and be masked) to convey the correct sense of spatial relationship of objects in the camera areas relative to the ego vehicle 50. The apparatus 100 may be configured to reduce the invalid area and/or generate an output to the display 118i without (or with much less) down-scaling. For example, by implementing the apparatus 100, the rear camera area of the display 118i may not be relegated to be a small portion of the entire area of the eMirror display 118i.

The video operations performed by the processors 106a-106n and/or selecting the appropriate lens characteristics of the rear camera lens 112c, the driver side lens 112f and the passenger side lens 112d may prevent objects/vehicles present behind the rear view camera 102c from being displayed in the final eMirror output in a shrunken manner (e.g., with low resolution). The apparatus 100 may present the panoramic (e.g., stitched three-in-one) video frames that prevent the video frames generated by the rear camera 102c from occupying only a very small portion of the entire eMirror display 118. The apparatus 100 may be configured to avoid a large wasted 'invalid' eMirror display area that conveys no scene information to the driver 202. By preventing the large invalid area, the apparatus 100 may enable the driver 202 to more easily judge distances of objects when looking at the display 118i The fields of view 252a-252b, 254a-254b and/or 256a-256b may represent a field of view of the raw images captured by the cameras. The field of view 252a-252b may partially overlap the field of view 254a-254b. The field of view 252a-252b may partially overlap the field of view 256a-256b. The overlapping of the field of views may result in some objects being captured by multiple cameras. If the raw images were stitched (e.g., joined edge-to-edge to create the panoramic video frame) irregularities and/or artifacts may be present in the panoramic video frame. For example, some objects may appear twice (e.g., double objects) and/or objects may change size based on the distances D2 and D1. The irregularities may result in inaccurate information being generated (e.g., one car appears twice), which may be distracting for the driver 202. The processors 106a-106n may perform blending and/or crop the raw images when performing the video stitching to prevent artifacts in the output panoramic video frames.

Figure 4:
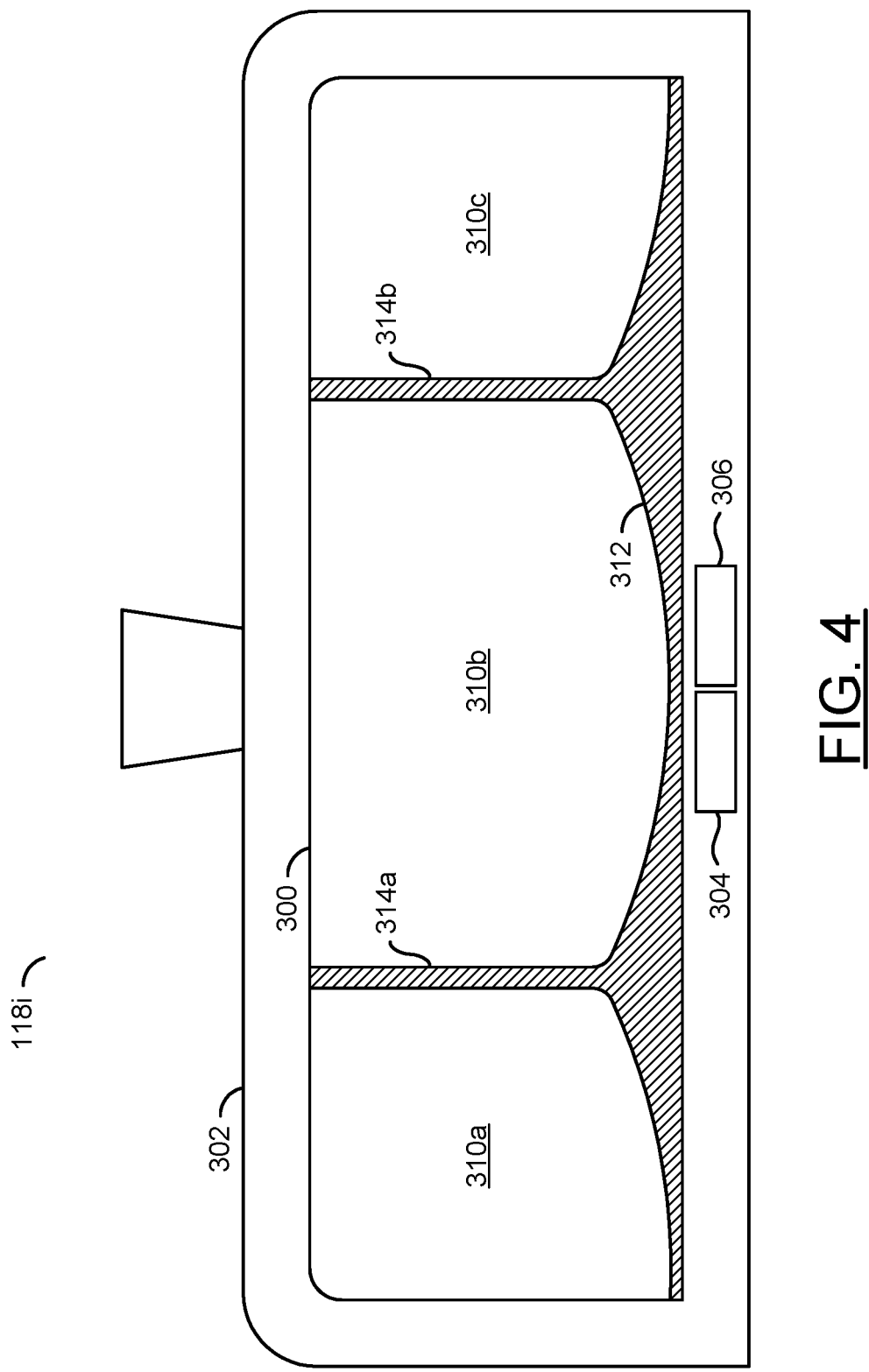
FIG. 4 is a diagram illustrating an example embodiment of an eMirror display.

Referring to FIG. 4, a diagram illustrating an example embodiment of the eMirror display 118i is shown. The eMirror display 118i may output (e.g., display) a panoramic video frame 300. The panoramic video frame 300 may be generated by the processors 106a-106n in response to the video frames (e.g., FRAMES_A-FRAMES_N) generated by the capture devices 102a-102n. For example, one of the signals VOUT_A-VOUT_N may provide the panoramic video frame 300.

The eMirror display 118 may comprise a bezel 302. The panoramic video frame 300 may be displayed within the framing created by the bezel 302. A button 304 and a button 306 is shown on the bezel 302. The button 304 and/or the button 306 may be configured to control various features of the eMirror display 118i (e.g., contrast adjustment, brightness adjustment, view selection, zoom control, data overlay for the panoramic video frame 300 such as numerical distances, etc.). In some embodiments, the eMirror display 118 may implement a touchscreen interface for controlling the various features (e.g., instead of and/or to supplement the button 304 and the button 306). In some embodiments, the eMirror display 118i may be implemented without the bezel 302 (e.g., edge-to-edge screen). The style, design and/or functionality implemented by the eMirror display 118i may be varied according to the design criteria of a particular implementation.

In the example shown, the panoramic video frame 300 may comprise three portions 310a-310c and an invalid area 312. The three portions 310a-310c may comprise video frames captured by the capture devices 102a-102n that have been stitched together by the processors 106a-106n to form the output panoramic video frame 300. In the example shown in association with FIG. 4, the portion 310a may correspond with the video frames FRAMES_F generated by the driver side capture device 102f, the portion 310b may correspond with the video frames FRAMES_C generated by the rear capture device 102c and the portion 310c may correspond with the video frames FRAMES_D generated by the passenger side capture device 102d. The size and/or shape of the portions 310a-310c and/or the invalid area 312 may be varied according to the design criteria of a particular implementation.

The processors 106a-106n may be configured to perform video operations (e.g., warping and/or scaling) of the video frames captured by the capture devices (e.g., 102c, 102d and 102f) corresponding to the lenses 112c, 112d and 112f of the ego vehicle 50. The video operations may further comprise video stitching to stitch the video frames (e.g., FRAMES_F, FRAMES_C and FRAMES_D) to generate the panoramic video frames 300. The processors 106a-106n may place the captured video frames into the assigned areas and stitch the video frames together to provide the final display for the panoramic video frames 300. The video operations performed by the processors 106a-106n may be configured to generate the panoramic video frames 300 to fit the size and/or shape of the eMirror display 118i. The eMirror display 118i may receive the signal VOUT_I and output the panoramic video frames 300.

The invalid area 312 may be a portion of the panoramic video frame 300 that does not display video data (e.g., a gap in the video data). For example, the invalid area 312 may comprise blank information (e.g., null video data) and/or masking. The invalid area 312 may comprise portions of the video frames (e.g., FRAMES_F, FRAMES_C and FRAMES_D) that overlap and/or result in other visual artifacts when the stitching operations are performed by the video processors 106a-106n. For example, the invalid area 312 may be intelligently selected by the processors 106a-106n to prevent visual distractions from appearing in the panoramic video frames 300. The visual distractions may cause the driver 202 difficulty and/or confusion when viewing the panoramic video frames 300.

The invalid area 312 may be an area that does not correspond to any of the camera views. In some embodiments, the invalid area 312 may comprise a mask such as a silhouette of a car representing the ego vehicle 50 drawn as an overlay to provide spatial reference relative to other vehicles/objects in the panoramic video 300 by the valid camera areas 310a-310c of the eMirror display 118. The apparatus 100 may be configured to generate the panoramic video frames 300 without having the rear view portion 310b appear significantly smaller than the side view areas 310a and 310c. The apparatus 100 may be configured to generate the panoramic video frames with a small invalid area 312. The apparatus 100 may be configured to compensate for the distance difference between the mounting locations of the rear camera 102c and the side cameras 102d and 102f without downscaling the video frames relative to each other.

The invalid area 312 may comprise blending lines 314a-314b. The blending line 314a is shown between the video frame area 310a and the video frame area 310b. The blending line 314b is shown between the video frame area 310b and the video frame area 310c. In the example shown, the blending lines 314a-314b may be in a default configuration. In the default configuration, the blending lines 314a-314b may have a vertical orientation across the eMirror display 118i. In the default configuration for the eMirror display 118i, the eMirror display 118i may comprise three video portions 310a-310c and the invalid area 312 may comprise the two blending lines 314a-314b in the vertical orientation. Each of the blending lines 314a-314b may separate two of the video portions 310a-310c. For example, the blending line 314a may separate the driver side rear video view 310a from the rear center view 310b and the blending line 314b may separate the passenger side rear video view 310c from the rear center view 310b (e.g., the rear center view 310b is located in between the two blending lines 314a-314b). The size, shape and/or orientation of the blending lines of the invalid area 312 may be varied according to the design criteria of a particular implementation.

The blending lines 314a-314b may correspond to gaps in the field of view of the panoramic video frame 300 (e.g., areas where the corresponding video data has been cropped out in order to prevent visual artifacts). The blending lines 314a-314b may correspond to locations of the panoramic video frame 300 where the video stitching operations performed by the video processing pipeline 156 joins together more than one of the video frames FRAMES_A-FRAMES_N together. The blending lines 314a-314b may conceal the portions of the video frames FRAMES_A-FRAMES_N that have been cropped out in order to prevent visual distortions at the stitching seams. By preventing the visual distortions, the gaps in the video data corresponding to the locations of the blending lines 314a-314b may result. The processors 106a-106n may be configured to adjust the blending lines 314a-314b (e.g., a location and/or orientation) from a default orientation to an adjusted orientation (or configuration) in response to the depth information from the monocular view.

In some embodiments, the processors 106a-106n may be configured to implement adaptive stitching locations boundaries. For example, the processors 106a-106n may be configured to adapt the stitching location boundary between the rear view area 310b and side view area 310a and the stitching location boundary between the rear view area 310b and the side view area 310c. The stitching boundaries may each adapt within a range. For example, the processors 106a-106n may determine whether the rear view 310b or the side views 310a or 310c contain more relevant content about vehicles/objects in the spatial range. For example, the CNN module 150 may perform object detection to determine which objects are in the spatial range, and the decision module 158 may determine which objects are more relevant.

In some embodiments, as a user-interface visual guidance to aid the driver 202, the processors 106a-106n may generate the invalid areas 312 as a mask to blend with the camera video images for forming the final signal VOUT_I for the eMirror display 118i. The mask for the invalid area 312 may shadow out some areas where the stitching seams (e.g., the blending lines 314a-314b) are, to make the stitching seams less visually disturbing. For example, the discontinuity of some horizontal road lines across the 3 camera views could be visually muted with the mask implemented by the invalid area 312. The mask may also aid in suggesting the spatial relationship between viewing out of the rear window of the ego vehicle 50 and viewing out of the rear-side windows of the ego vehicle 50.

In some embodiments, the blending lines 314a-314b may not be visible on the panoramic video frame 300 displayed on the eMirror 118i. The stitching and/or blending of the video frames used to generate the panoramic video frame 300 may be performed to provide a relatively seamless transition from one video frame portion to the next video frame portion. In the examples shown, the invalid area 312 and/or the blending lines 314a-314b may provide an illustrative example of the locations of the blending lines but may not actually be visible on the actual panoramic video frame 300 displayed on the eMirror 118i.

Figure 5:
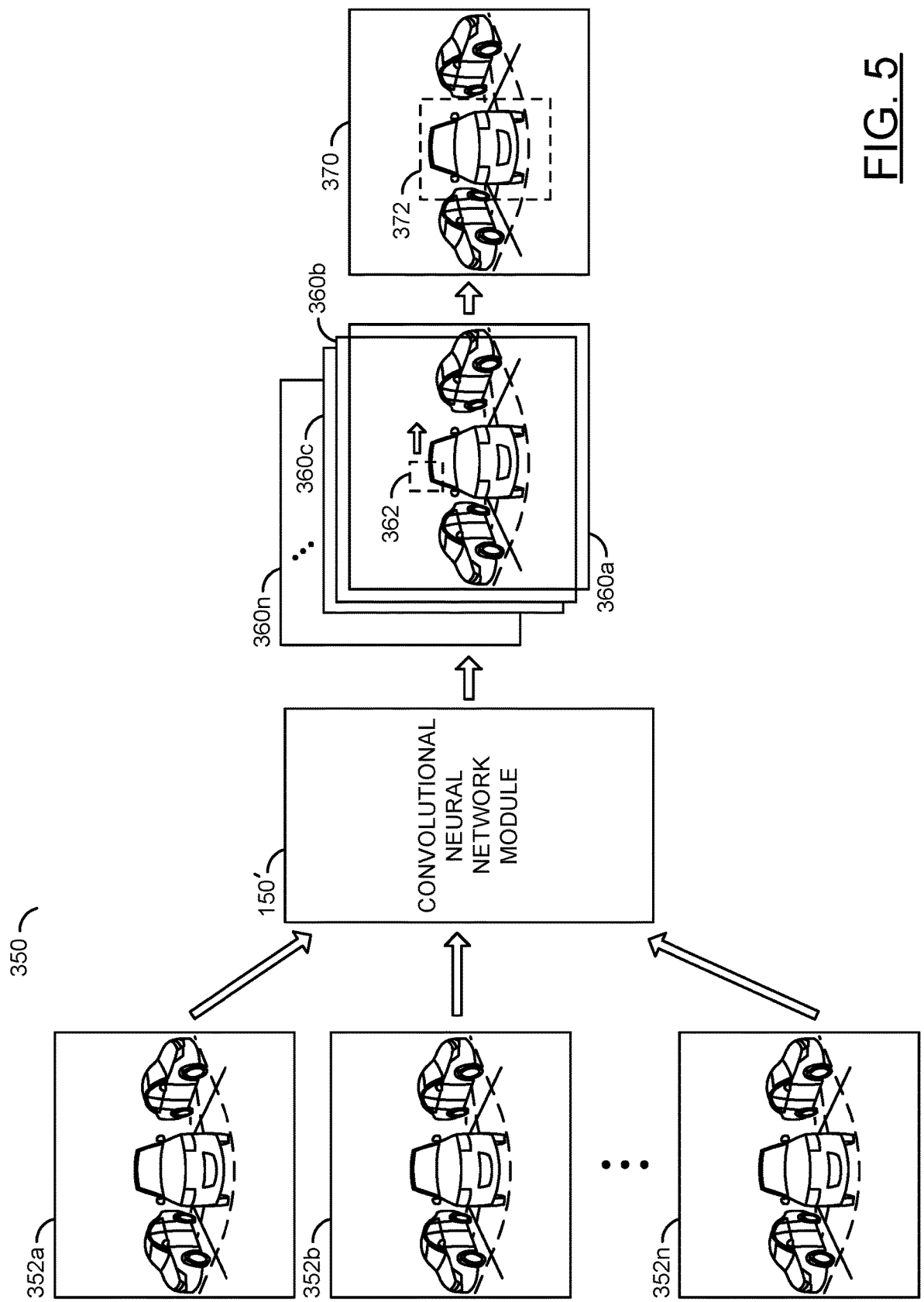
FIG. 5 is a diagram illustrating an example visualization of training a convolutional neural network for object detection using fleet learning.

Referring to FIG. 5, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the ego vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture a rear view with one or more objects (e.g., other cards) present. Using the training data 352a-352n (e.g., video frames captured from many different vehicles), many training data sets may be available to train the CNN module 150'. In an example, different makes and models may be analyzed. In another example, objects located at different distances and/or positions may be analyzed. In yet another example, different object types (e.g., cars, people, animals, bicycles, etc.) may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 370. The reference video frame 370 may comprise masks and/or categorized instances of the reference objects 372. The reference objects 372 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

The CNN module 150 may be configured to determine a depth of an object based on an analysis of the video frames (e.g., the video frames FRAMES_C) from a single camera (e.g., the rear center capture device 102c). The depth determined based on analysis of the video frames from the single camera 102c may be a monocular depth. The monocular depth may be determined based on machine learning. In an example, the machine learning implemented may comprise BTS (Bit-to-Small), DL_61 (DORN), Pattern-Affinitive Propagation across Depth, Surface Normal and Semantic Segmentation (PAP), etc. The learning base used may be varied according to the design criteria of a particular implementation. The CNN module 150 may calculate the depth of the object in response to the result of the training. For example, by training against reference images of various types of objects (e.g., different vehicle types, pedestrians, animals, bicycles, buildings, etc.) located at various distances from the lens of the capture device, the CNN module 150 may be configured to calculate and/or estimate depth measurements based on a monocular view. In some embodiments, the reference frames 352a-352n may be analyzed and cross-referenced with distance and/or depth measurements (e.g., physical measurements, measurements from the sensors 114 such as radar and/or LIDAR, etc.).

Figure 6:
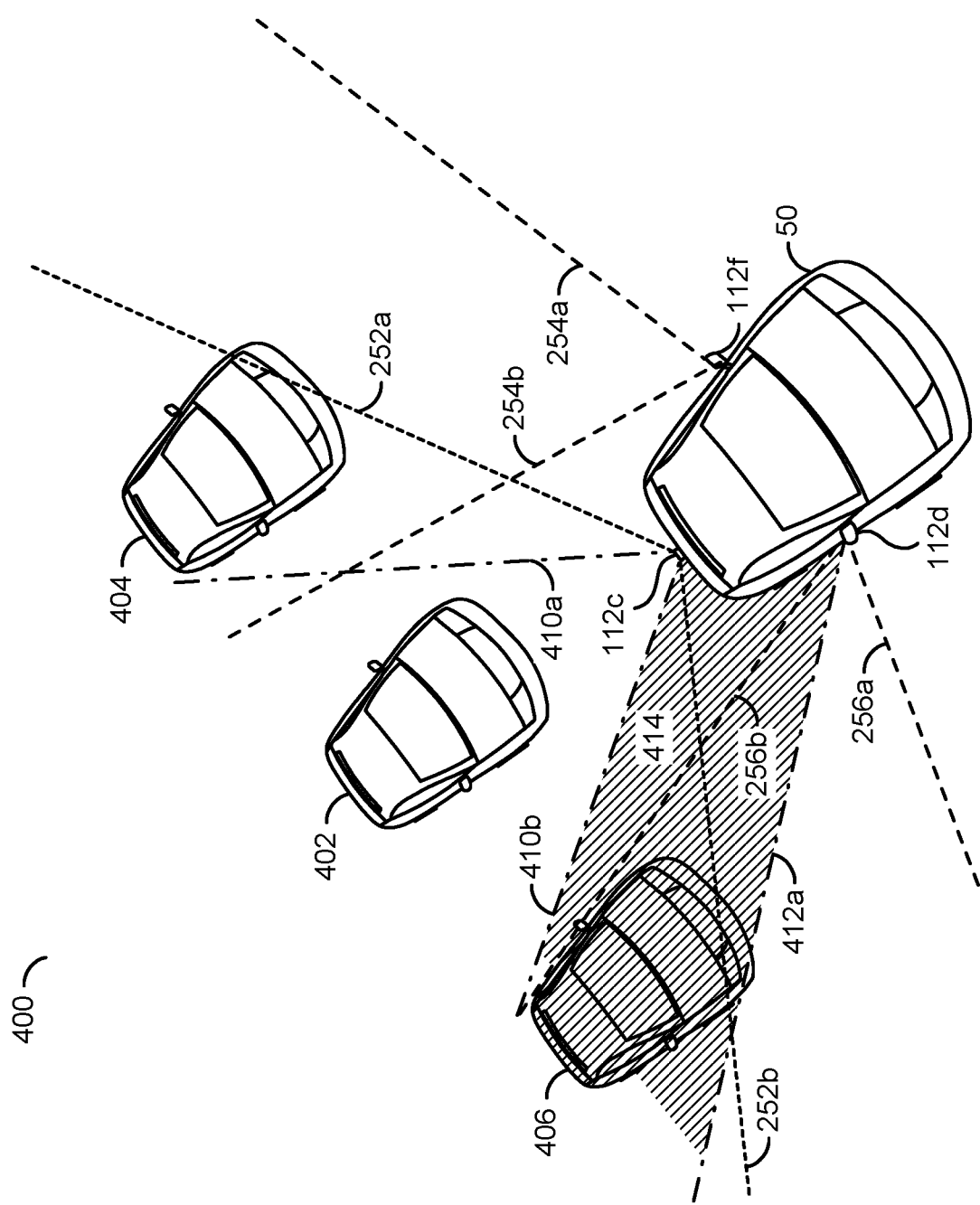
FIG. 6 is a diagram illustrating camera fields of view and blending areas in an example driving scenario.

Referring to FIG. 6, a diagram illustrating an example driving scenario 400 is shown. The ego vehicle 50 is shown in the driving scenario 400. The side view camera lenses 112d and 112f and the rear camera lens 112c are shown on the ego vehicle 50. For example, the lens 112c may be at a nominal location corresponding to the rear center tail-light location of the ego vehicle 50 and the lenses 112d and 112f may be at nominal locations corresponding to locations of traditional side mirrors. The field of view 254a-254b of the driver side lens 112f is shown. The field of view 256a-256b of the passenger side lens 112d is shown. The field of view 252a-252b of the rear lens 112c is shown.

A vehicle 402, a vehicle 404 and a vehicle 406 are shown in the example scenario 400. The vehicle 402, the vehicle 404 and the vehicle 406 are shown behind the ego vehicle 50. The vehicle 402 may be directly behind the ego vehicle 50. The vehicle 404 may be behind the ego vehicle 50 and one lane over (e.g., one lane to the left side of the ego vehicle 50 from the perspective of the driver 220). The vehicle 406 may be behind the ego vehicle 50 and one lane over (e.g., one lane to the right side of the ego vehicle 50 from the perspective of the driver 220).

In the example scenario 400, the vehicle 402-406 may be within the field of view 252a-252b of the rear lens 112c. In the example scenario 400, the vehicle 404 may be within the field of view 254a-254b of the driver side lens 112f and the vehicle 402 and the vehicle 406 may not be within the field of view 254a-254b. In the example scenario 400, the vehicle 406 may be within the field of view 256a-256b of the passenger side lens 112d and the vehicle 402 and the vehicle 404 may not be within the field of view 256a-256b.

Lines 410a-410b are shown extending from the lens 112c. The lines 410a-410b may represent a location that corresponds to the default location of the blending lines of the stitched panoramic video frame 300. The lines 410a-410b may have a narrower field of view than the field of view 252a-252b. In an example, the video data captured corresponding to the field of view 252a-252b may be the raw image captured by the capture device 102c and the video data captured corresponding to the blended field of view 410a-410b may be the video portion 310b of the panoramic video frame 300. In the example shown, the vehicle 402 may be within the blended field of view 410a-410b. In the example shown, the vehicle 404 may be beyond the blending line 410a and the vehicle 406 may be beyond the blending line 410b (e.g., the vehicles 404-406 may not be within the blended field of view 410a-410b and would not appear in the video portion 310b).

A line 412a is shown extending form the lens 112d. The line 412a may represent a location that corresponds to the default location of the blending line for the stitched panoramic video frame 300. The blending line 412a may be in between the field of view lines 256a-256b. In an example, the video data captured corresponding to the field of view 256a-256b may be the raw image captured by the capture device 102d and the video captured within the blending line 412a and the field of view line 256a may be the video portion 310a of the panoramic video frame 300. In the example shown, the vehicle 406 may not be within the blended field of view 256a-412a (e.g., the vehicle 406 may not appear in the video portion 310b).

The vehicle 406 is within the raw image field of view 252a-252b and the raw image field of view 256a-256b. If the raw images corresponding to the field of view 252a-252b and the field of view 256a-256b were stitched together (e.g., without blending or cropping applied by the video processing pipeline 156), then the vehicle 406 would appear as a double object. For example, one perspective of the vehicle 406 captured by the capture device 102c would be shown and one perspective of the vehicle 406 captured by the capture device 102d would be shown. The double object would be a visual artifact that may be distracting to the driver 202. The video processing pipeline 156 may implement cropping, masking and/or blending to prevent double images. In some scenarios, the double object issue may not be able to be avoided.

A region 414 is shown. The region 414 may be between the blending line 412a for the capture device 102d and the blending line 410b for the capture device 102c. The region 414 may represent a gap in the field of view of the panoramic video frame 300. The vehicle 406 may be within the gap 414. For example, even though the vehicle 406 is located behind the ego vehicle 50, using the default blending orientation, the vehicle 406 may not appear in the panoramic video frame 300. The vehicle 406 would be a missing object. For example, to prevent the visual distraction caused by the double object, a new visual artifact is created that results in a missing object.

The location behind the ego vehicle 50 that corresponds to the gap 414 may be a result of various factors such as the camera poses, the size of the fields of view captured by each of the capture devices 102c, 102d and 102f and/or where the capture devices 102c, 102d and 102f are mounted on the ego vehicle 50. In an example, the distance behind the ego vehicle 50 that corresponds to the gap 414 (e.g., where the vehicle 406 would be a missing object in panoramic video frame 300) may be approximately 5 m-15 m. Whether the object (e.g., the vehicle 406) is entirely missing or partially missing may depend on the size of the object, the distance of the object and/or the angle of the object from the rear end of the ego vehicle 50. For example, in different scenarios, the location and/or distance of the gap 414 behind the ego vehicle 50 may be different. The apparatus 100 may be configured to dynamically adapt to various locations that may result in the gap 414 by adjust the locations of the blending lines 314a-314b. The location and/or distance behind the ego vehicle 50 that corresponds to the location of the gap 414 may be varied according to the design criteria of a particular implementation.

Figure 7:
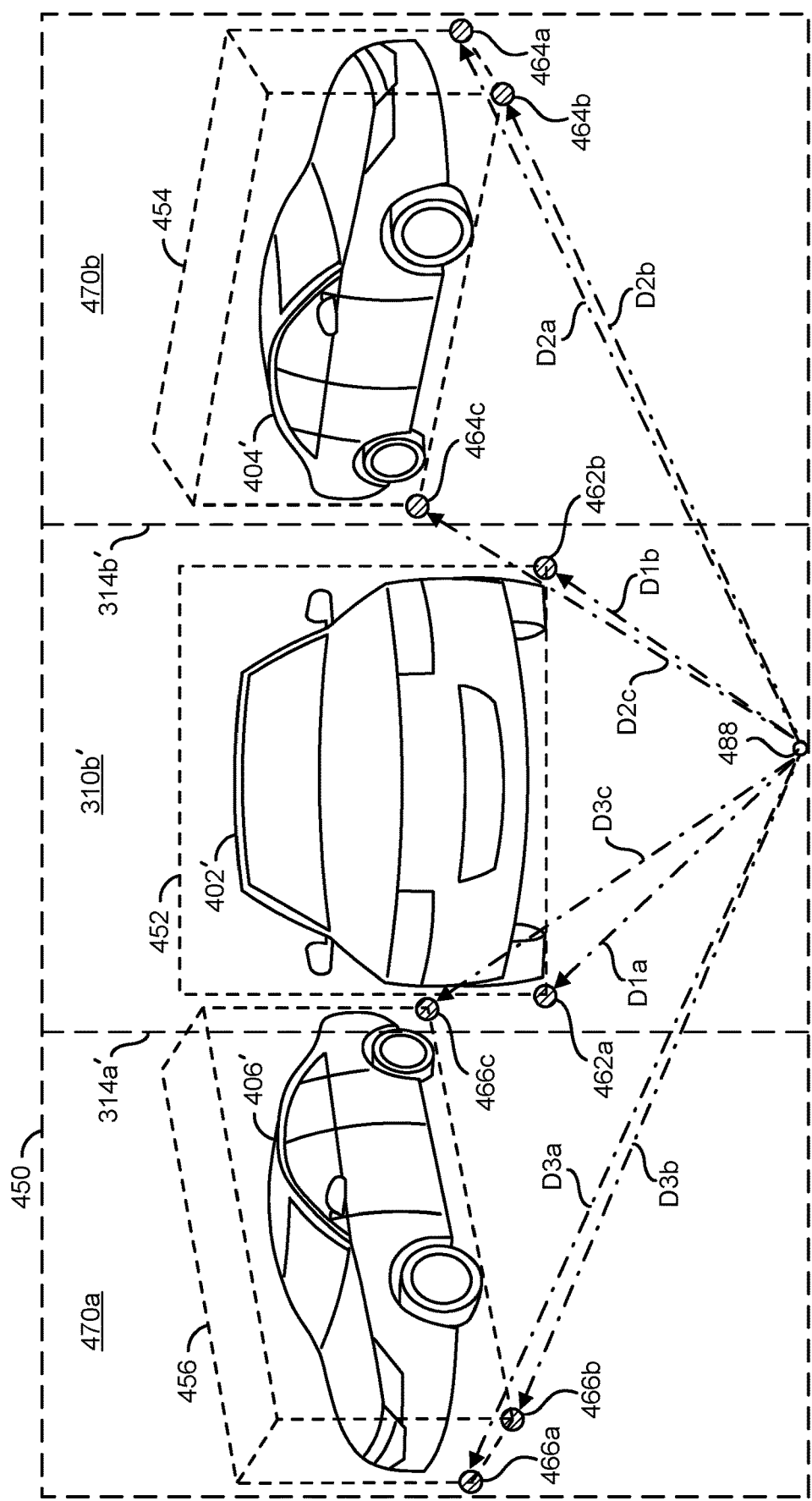
FIG. 7 is a diagram illustrating an example non-rectilinear video frame captured by a rear camera.

Referring to FIG. 7, a diagram illustrating an example non-rectilinear video frame 450 captured by the rear camera 102c is shown. The example non-rectilinear video frame 450 may be an example of a video frame captured by a camera with a 90 degree field of view (FOV) lens and a 6 mm sensor. The non-rectilinear video frame 450 may be one of the distorted frames generated by the processors 106a-106n. In one example, the non-rectilinear video frame 450 may be one of the video frames FRAMES_C captured by the capture device 102c via the lens 112c having a barrel/fisheye lens characteristic and presented to the processors 106a-106n.

While the non-rectilinear video frame 450 is shown, in some embodiments the processors 106a-106n (e.g., using the video pipeline 156) may be configured to perform de-warping video operations on the non-rectilinear video frame 450 in order to generate a rectilinear video frame. For example, various video analysis operations performed by the processors 106a-106n (e.g., object detection performed using the CNN module 150) may be performed on the non-rectilinear video frame 450 and/or a de-warped version of the non-rectilinear video frame 450. In some embodiments, the video analysis may use fewer computational resources when performed on a rectilinear video frame (e.g., a video frame without barrel distortion). In some embodiments, the processors 106a-106n may be configured to account for the barrel distortion when detecting objects and/or calculating distances.

The non-rectilinear video frame 450 may represent a monocular view (e.g., a video frame captured by one capture device). The apparatus 100 may be configured to determine the distance and/or locations of objects in response to the monocular view in order to reduce an amount of time and/or computational cost compared to determining a 3D positioning of objects using stereo images. The non-rectilinear video frame 450 may be captured by the rear-center camera lens 112c. The non-rectilinear video frame 450 may represent a raw image. In an example, portions of the non-rectilinear video frame 450 may be cropped out when the video stitching operations are performed. For example, the panoramic video frame 300 may not comprise all of the non-rectilinear video frame 450.

The example non-rectilinear video frame 450 may comprise a front view of the vehicle 402'. An angled view of the vehicle 404' is shown in the non-rectilinear video frame 450. An angled view of the vehicle 406' is shown in the rectilinear video frame 450. The content of the non-rectilinear video frame 450 may generally correspond with the field of view 252a-252b shown in the example scenario 320 in association with FIG. 6.

In some embodiments, the lens characteristics of the lens 112c may enable the processors 106a-106n to receive the non-rectilinear video frame 450. In one example, the lens characteristics may be a fisheye and/or barrel distortion. In another example, the lens characteristics may be a panoramic lens that exhibits fisheye/barrel lens distortion along the horizontal direction and the sensor 140a may have a 6 mm sensor size. In some embodiments, the processors 106a-106n may perform video operations to digitally warp a rectilinear video frame to generate the non-rectilinear video frame 450. For example, a portion of the non-rectilinear video frame 450 may be used as the portion 310b for the video stitching operations in order to generate the panoramic video frame 300 in order to reduce the amount of the invalid area 312 on the panoramic video frame 300.

The apparatus 100 may use non-rectilinear processes in the formation of the camera views. The non-rectilinear view may cause distortion of the objects in the non-rectilinear video frame 450. The apparatus 100 may leverage the distortion for generating the panoramic video frame 300 with desirable attributes (e.g., size continuity at stitching points, reduced invalid area 312, reduced scaling, etc.). With judicious choice of lens characteristics for the side cameras (e.g., 102d and 102f), object sizes may be similarly matched over a wide range of distances between the rear and side views across a stitching point.

A bounding box 452 is shown around the vehicle 402'. A bounding box 454 is shown around the vehicle 404'. A bounding box 456 is shown around the vehicle 406'. The bounding boxes 452-456 may represent detection of objects performed by the processors 106a-106n. In an example, the object detection performed by the CNN module 150 may detect the vehicles 402'-406'. While the detected objects correspond to vehicles in the example shown, the objects detected may comprise other objects and/or obstacles (e.g., pedestrians, buildings, road signs, trees, animals, bicycles, etc.).

In the example shown, the bounding boxes 452-456 are shown as a wireframe model around the respective objects 402'-406'. Circles (or points) 462a-462b are shown where the corners of the wireframe bounding box 452 for the vehicle 402' meets the ground. Circles (or points) 464a-464c are shown where the corners of the wireframe bounding box 454 for the vehicle 404' meets the ground. Circles (or points) 466a-466c are shown where the corners of the wireframe bounding box 456 for the vehicle 406' meets the ground. Based on the points 462a-462b, the processors 106a-106n may determine the position on the ground of the vehicle 402' to determine the distance and/or location. Based on the points 464a-464c, the processors 106a-106n may determine the position on the ground of the vehicle 404' to determine the distance and/or location. Based on the points 466a-466c, the processors 106a-106n may determine the position on the ground of the vehicle 406' to determine the distance and/or location.

Arrows D1a-D1b, arrows D2a-D2c and arrows D3a-D3c are shown extending from a location 488 on the panoramic video frame 450. The location 488 may represent a location of the lens 112c. The arrows D1a-D1b, the arrows D2a-D2c and the arrows D3a-D3c may represent a distance measurement from the lens 112c to each of the objects 452-456 (e.g., the position on the ground of each object). In the example shown, the arrows D1a-D1b may represent a distance measurement of the vehicle 402', the arrows D2a-D2c may represent a distance measurement of the vehicle 404' and the arrows D3a-D3c may represent a distance measurement of the vehicle 406'. Generally, a distance measurement may be performed for each object detected by the processors 106a-106n.

While the distance measurements are shown as the arrows D1a-D1b, arrows D2a-D2c and arrows D3a-D3c, the distance measurements performed by the processors 106a-106n may be calculated using a depth map. For example, the processors 106a-106n may generate a depth map representing measured distances in order to determine the monocular depth information. The depth map may be generated by performing the video analysis and/or object detection using the CNN module 150. The depth map may be compared to a pose of the capture device 102c. In an example, the capture devices 102a-102n may be configured to provide feedback to the processors 106a-106n about the orientation (e.g., amount of tilting, panning, azimuth, etc.) of the capture devices 102a-102n. By comparing the depth map to the pose of the capture device 102c, the monocular depth of each of the detected objects 452-456 may be determined by the processors 106a-106n.

The monocular depth of the detected objects 452-456 may not be a precise measurement. For example, monocular depth measurements are generally considered inaccurate. However, using the training of the CNN module 150, the monocular depth measurement may be accurate enough to confirm whether the detected objects 452-456 are located in the gap 414 (e.g., the missing object range). In one example, the monocular depth may be a vector measurement (e.g., provides a depth measurement and an angle). The monocular depth measurement may provide both a distance and an angle to enable the processors 106a-106n to determine both the depth and position of the detected objects 452-456. For example, the detected object 452 may have the same absolute distance from the lens 112c as the detected object 456, but since the detected object 452 is directly behind the lens 112c the detected object 452 may not be within the gap 414, while the detected object 456 may be within the gap 414.

The locations for the blending lines 314a'-314b' are shown on the non-rectilinear video frame 450. For example, the portion 310b' of the panoramic video frame 450 shown between the locations of the blending lines 314a'-314b' may be within the blended field of view 410a-410b shown in association with FIG. 6. Portions 470a-470b of the video frame 450 are shown. The portions 470a-470b are shown beyond the blending lines 314a'-314b' (e.g., outside of the blended field of view 410a-410b). In an example, the portions 470a-470b may be cropped out when generating the panoramic video frame 300.

The vehicle 406' may be within the gap 414. For example, the portion 470a comprising a view of the vehicle 406' may be cropped out of the panoramic video frame 300. If the video data captured by the passenger side capture device 102d used in the panoramic video frame 300 also crops out the vehicle 406', then the vehicle 406' may not be visible in the output panoramic video frame 300. The vehicle 406' may be a missing object. While the example described may correspond to the detected object 456, similarly, the vehicle 404' could be a missing object depending on the depth and/or position of the detected object 454.

In the default configuration of the locations of the blending lines 314a'-314b', only the portion 310b' may be used in the output panoramic video frame 300. However, the video data in the portions 470a-470b may be usable video data. The processors 106a-106n may be configured to adjust the locations of the blending lines 314a'-314b' to include some or all of the portions 470a-470b in the panoramic video frame 300. The processors 106a-106n may adjust the locations of the blending lines 314a'-314b' in response to the depth information determined by the CNN module 150.

Figure 8:
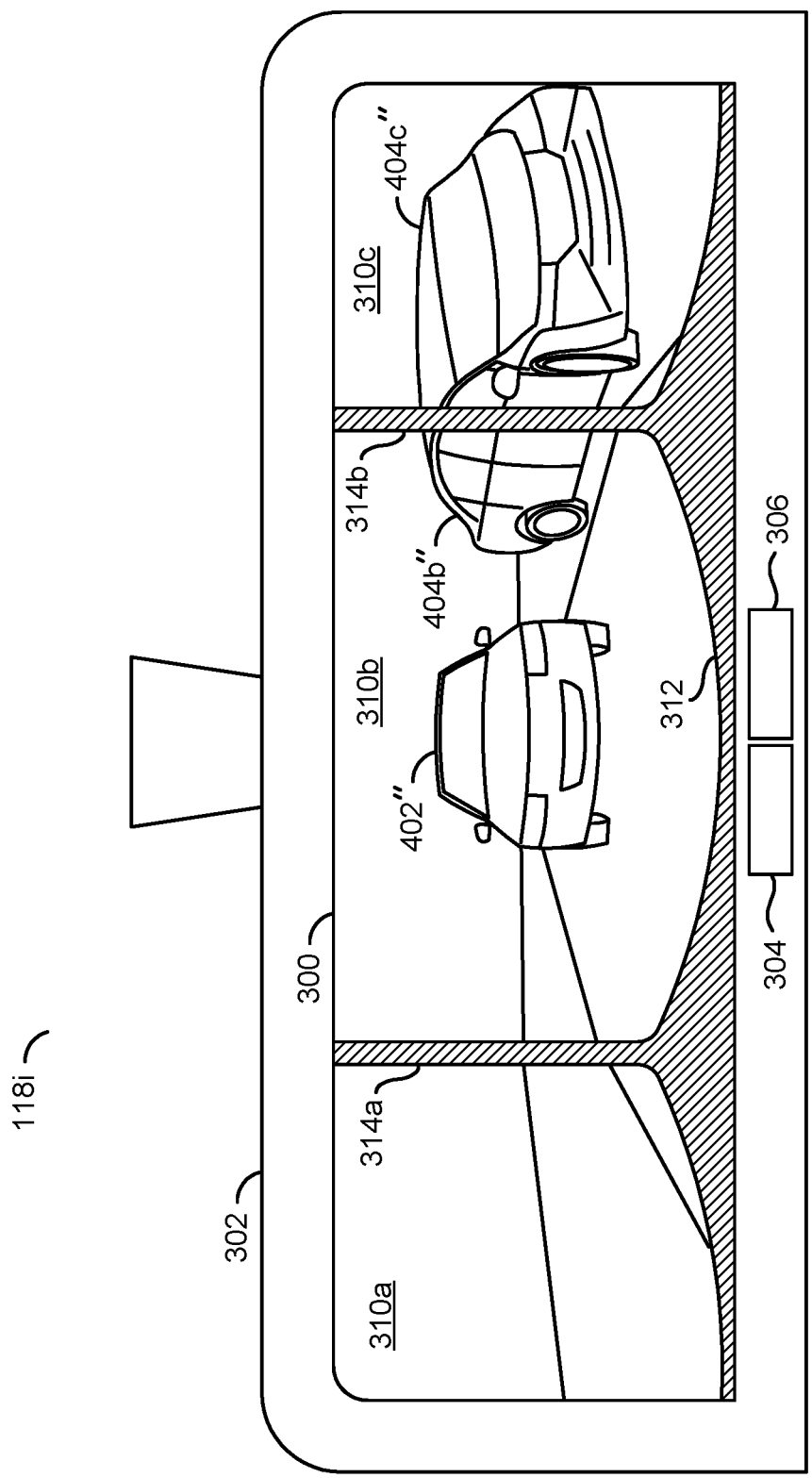
FIG. 8 is a diagram illustrating an example panoramic video frame output to an eMirror display that has a missing object.

Referring to FIG. 8, a diagram illustrating an example panoramic video frame 300 output to the eMirror display 118i is shown. The eMirror 118i is shown having the bezel 302, the button 304 and/or the button 306. The panoramic video frame 300 is shown on the eMirror display 118i. Stitched video data (e.g., combined from the captured devices 102c, 102d and 102f) is shown displayed as the panoramic video frame 300.

The panoramic video frame 300 may comprise the portions 310a-310c, the invalid area 312 and the blending lines 314a-314b in a default orientation. For example, the portion 310a may correspond to the blended field of view (e.g., within the blending line 412a and the line 256a shown in association with FIG. 6) captured by the passenger side lens 112d, the portion 310b may correspond to the blended field of view 410a-410b captured by the rear lens 112c and the portion 310c may correspond to the blended field of view captured by the driver side lens 112f. The video data of the panoramic video frame 300 may comprise the portion 310b' from the non-rectilinear video frame 450 shown in association with FIG. 7. Portions of the video data captured by the capture device 102c, the capture device 102d and the capture device 102f may be stitched together by the processors 106a-106n.

In some embodiments, the processors 106a-106n may add the invalid area 312 and/or the blending lines 314a-314b as a mask layer to the output panoramic video frame 300. Implementing a mask layer may hide stitching artifacts and/or other visual distractions. In some embodiments, the invalid area 312 and/or the blending lines 314a-314b may not be visible on the display 118i.

Many of the objects and/or references shown in the panoramic video frame 300 may cross the blending lines 314a-314b (e.g., the stitching seam) and appear across more than one of the portions 310a-310c. In the example shown, the vehicle 402" may appear (e.g., entirely as a completely object) in the portion 310b. In the example shown, a portion 404a" of the vehicle 404 may appear in the portion 310a of the panoramic video frame 300 and a portion 404b" of the vehicle 404 may appear in the portion 310b of the panoramic video frame 300.

In some embodiments, the processors 106a-106n may be configured to preserve a size continuity of objects (e.g., the vehicle 404a"-404b") across the blending lines 314a-314b (e.g., the stitching seam) between the portions 310a-310b and/or the portions 310b-310c. In the panoramic video frame 300, the vehicle 402" captured by the rear lens 112c may appear large when the apparatus 100 generates the panoramic video frame 300. For example, the distortion used to generate the non-rectilinear video frames for the portions 310a-310c may limit an amount of scaling needed to maintain the size continuity. Using the apparatus 100 may enable a license plate of cars positioned directly behind the rear camera 102c to be much more readable because of the increased size and resolution compared to downscaled images that would result if rectilinear video frames were used. For example, the apparatus 100 may be configured to operate as a dual purpose device simultaneously providing the panoramic video frames for the eMirror display 118 and as part of a digital video recording (DVR) system too (e.g., capable of reading license plates for insurance purposes) using only the capture devices 102c, 102d and 102f. Generally, capturing the identity of other vehicles in the scene with greatest clarity and resolution is a very important goal of a DVR system.

The apparatus 100 may display the relevant information (e.g., maintain the size continuity at the stitching seams and/or reduce the invalid area 312) using non-rectilinear properties of lenses and/or non-rectilinear digital warping of images. The non-rectilinear properties may be selected to present objects close to the center of a camera with a large size, and reduce/taper down the size of the object(s) as the location is moved farther away from the camera center. The amount of distortion may be selected (e.g., either by selecting the lenses or determining the amount of digital warping to apply) to nearly match object sizes at the stitch boundary between rear and side views, over a wide range of object distances.

The panoramic video frame 300 may appear as a generally continuous field of view displayed on the eMirror display 318i. However, there may be gaps in the field of view (e.g., the video data in the stitched video frame may not have an exact one-to-one correlation with the real world view) presented in the panoramic video frame 300. The apparatus 100 may be configured to reduce visual distractions that happen when an object crosses the stitch boundaries 314a-314b. However, the blending used to reduce the visual distractions may result in missing objects (e.g., gaps in the video data).

In the example shown, no objects are displayed on the video portion 310a. For example, the vehicle 406 is not visible in the video data of the panoramic video frame 300. However, based on the scenario 400 shown in association with FIG. 6 and the raw video frame 450 shown in association with FIG. 7, the vehicle 406 is present behind the ego vehicle 50. In the panoramic video frame 300 generated using the default orientation of the blending lines 314a-314b, the vehicle 406 may be a missing object. For example, when the vehicle 406 is in the gap (e.g., at the stitching seam 314a) there may be no video data of the vehicle 406 output to the display 318i. Based on the depth and position detected by the processors 106a-106n from the monocular view from the lens 112c, the processors 106a-106n may be configured to determine when one of the objects is in the gap in the video data and adjust the blending lines 314a-314b so that the object becomes at least partially visible.

Figure 9:
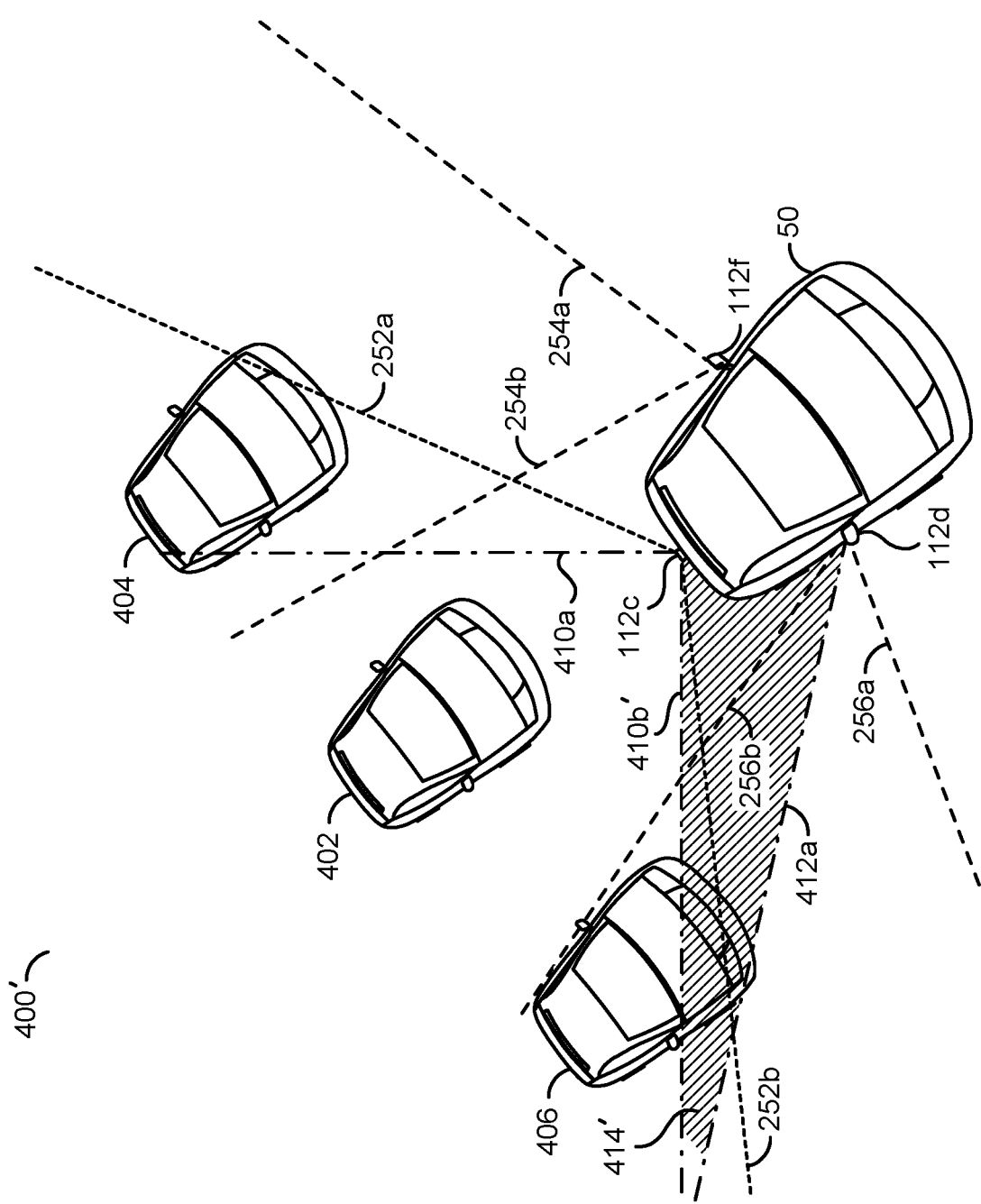
FIG. 9 is a diagram illustrating camera fields of view and adjusted blending areas in an example driving scenario.

Referring to FIG. 9, a diagram illustrating camera fields of view and adjusted blending areas in an example driving scenario is shown. An example driving scenario 400' is shown. The driving scenario 400' may be a scenario similar to the driving scenario 400 shown in association with FIG. 6. The ego vehicle 50 is shown. The vehicles 402-406 are shown behind the ego vehicle 50. The lens 112c, the lens 112d and the lens 112f are shown on the ego vehicle 50. The raw image field of view 252a-252b from the rear center lens 112c is shown. The raw image field of view 254a-254b from the driver side lens 112f is shown. The raw image field of view 256a-256b from the passenger side lens 112d is shown.

When the processors 106a-106n determine that one or more objects is in the gap in the video data, the processors 106a-106n may adjust the location of the blending lines 314a-314b. In an example, the CNN module 150 may detect the vehicle 406 and determine the depth and/or position of the vehicle 406 using only the monocular view from the rear center lens 112c. The decision module 158 may compare the depth and/or position of the vehicle 406 with the known location of the blending lines 314a-314b that correspond to the gaps in the panoramic video frame 300. If the vehicle 406 is not visible in the panoramic video frame 300 (e.g., the entire vehicle 406 is the gap 414), then the processors 106a-106n may adjust the blended field of view 410a-410b (e.g., adjust the orientation and/or location of one or more of the blending lines 314a-314b).

The blended field of view line 410a is shown without an adjustment (e.g., in the same location as shown in the scenario 400 shown in association with FIG. 6). The blended field of view line 410b' is shown as adjusted. The blended field of view line 410b' may be adjusted so that at least a partial view of the vehicle 406 is within the blended field of view 410a-410b'. In the example shown, only the blended field of view line 410b' has been adjusted. However, one or both of the blended view lines 410a-410b may be adjusted depending on the design criteria of a particular implementation and/or the location of the objects in a particular driving scenario. Similarly, the blended field of view line 412a corresponding to the lens 112d may also be adjusted. For example, the blended field of view line 412a may be adjusted an equivalent amount as the adjusted blended field of view line 410b' (e.g., to prevent introducing new visual artifacts).

Adjusting the blending lines may result in an adjusted location for the gap 414'. In the example driving scenario 400' the location of the gap 414' has been adjusted so that only a portion of the vehicle 406 is in the gap 414'. If only a portion of the vehicle 406 is within the gap 414', then at least a portion of the vehicle 406 may be visible on the output panoramic video frame 300. In some embodiments, the location of the gap 414' may be adjusted so that the objects are at least partially visible in the output panoramic video frame 300. In some embodiments, the location of the gap 414' may be adjusted so that the objects are shown as complete objects (e.g., the vehicle 406 is completely shown in one of the portions 310a-310c instead of being split between two of the portions 310a-310c). The minimum amount of an object and/or which portions of the object (e.g., the front end of a car should be visible but the back end may be cut off) that is to be visible in the output panoramic video frame 300 after the adjustment to the blending lines 314a-314b may be varied according to the design criteria of a particular implementation.

The processors 106a-106n may adjust the orientation of the blending lines 314a-314b without physically moving the lens 112c. Adjusting the blending lines 314a-314b may enable the processors 106a-106n to output a different portion of the raw video frame 450. For example, outputting a different portion of the raw video frame 450 may be achieved by cropping out a different section of the raw video frame 450 (e.g., some of the portion 460a shown in association with FIG. 7 that would have been cropped out when using the default orientation for the blending lines 314a'-314b' may be used in the output panoramic video frame 300).

Figure 10:
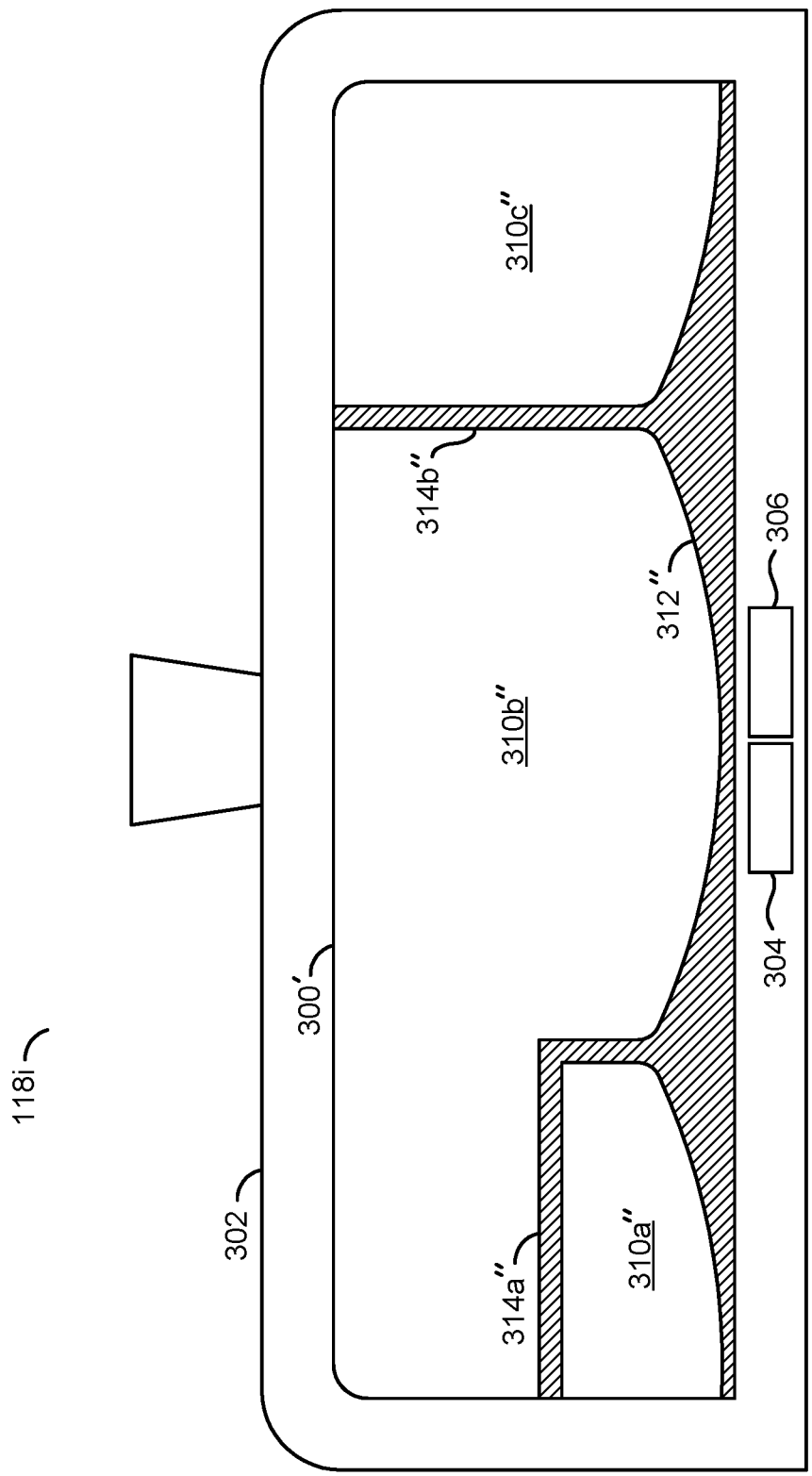
FIG. 10 is a diagram illustrating an example embodiment of an eMirror display with an adjusted blending line.

Referring to FIG. 10, a diagram illustrating an example embodiment of an eMirror display with an adjusted blending line is shown. The eMirror 118i is shown having the bezel 302, the button 304 and/or the button 306. The panoramic video frame 300' is shown on the eMirror display 118i (e.g., without video data displayed for illustrative purposes).

The panoramic video frame 300' may comprise the portions 310a"-310c", the invalid area 312" and the blending lines 314a"-314b". The blending lines 314a"-314b" are shown in an adjusted orientation (or adjusted configuration). The adjusted orientation 314a"-314b" may be one example adjusted orientation. The blending lines 314a"-314b" may be adjusted based on the locations (e.g., depths and positions) of the detected objects 452-456. Locations for the blending lines 314a"-314b" on the output video frame 300' may be determined in response to the depth information determined by the CNN module 150. The video stitching operations may be performed by the video processing pipeline 156 based on the locations of the blending lines 314a"-314b" (e.g., the multiple video frames may be joined together at locations corresponding to the locations of the blending lines 314a"-314b"). Other adjusted orientations for the blending lines may be generated by the processors 106a-106n based on the design criteria of a particular implementation and/or the locations (or distances or positions) of the objects detected from the monocular field of view from the rear center capture device 102c.

The adjusted portion 310b" may be within the adjusted blending lines 314a"-314b". The adjusted portion 310b" may generally correspond to the adjusted blended field of view (e.g., within the blending field of view line 410a and the adjusted blending field of view line 410b' shown in association with FIG. 9) captured by the rear center lens 112c. The portion 310a" is shown as having a reduced size (e.g., since the center adjusted portion 310b" has been adjusted to use a larger proportion of the adjusted panoramic video frame 300'). In the example shown, the portion 310c" may generally be the same since the location of the blending line 314b" may not have been adjusted. However, in some embodiments, some or all of the portions 310a-310c may be adjusted.

In the example shown, the adjusted orientation of the blending line 314a" may be a horizontal orientation. For example, the blending line 314 may be adjusted from the default orientation of a vertical line to the adjusted orientation of the horizontal blending line 314a". The horizontal orientation of the adjusted blending line 314a" may enable the adjusted portion 310b" to be extended while proportionately reducing the size of the adjusted portion 310a".

Figure 11:
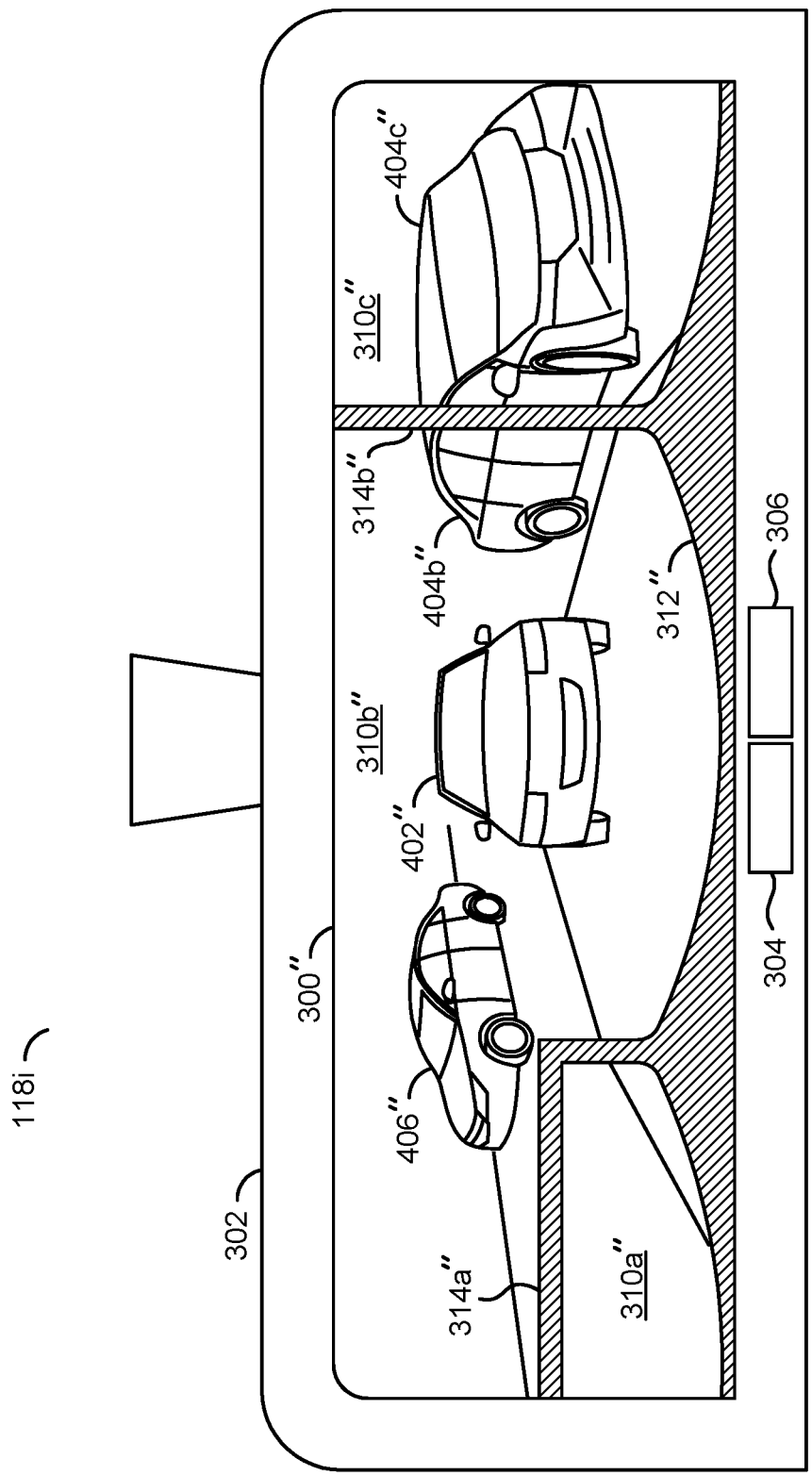
FIG. 11 is a diagram illustrating an example panoramic video frame output to an eMirror display with an adjusted blending line for showing an object.

Referring to FIG. 11, a diagram illustrating an example panoramic video frame output to an eMirror display with an adjusted blending line for showing an object is shown. The eMirror 118i is shown having the bezel 302, the button 304 and/or the button 306. The blending lines 314a"-314b" are shown in the adjusted orientation described in association with FIG. 10.

The video data of the panoramic video frame 300" is shown. The video data of the panoramic video frame 300" may comprise the portion 310b" generated from the non-rectilinear video frame 450 shown in association with FIG. 7. Portions of the video data captured by the capture device 102c, the capture device 102d and the capture device 102f may be stitched together by the processors 106a-106n. The panoramic video frame 300" may be generated as the result of the video stitching operations and the adjustment to the orientation of the blending lines 314a"-314b".

In the example shown, the adjusted video portion 310a" may not comprise any of the detected objects 452-456. The decision module 158 may determine that the adjusted video portion 310a" may be scaled down because no relevant objects are visible. For example, if the video portion 310a" did comprise a relevant object (e.g., the capture device 112d captures an object that is not detected in video frames captured by the capture device 102c and/or the capture device 102f), then the decision module 158 may be configured to adjust the blending line 314a" to show more of the adjusted video portion 310a" (e.g., adjust the blending lines 314a"-314b" so that at least a portion of each detected object is visible).

In the example shown, the entire vehicle 402" is shown in the adjusted video portion 310b". The vehicle 406" is shown in the adjusted portion 310b". The processors 106a-106n may be configured to generate the panoramic video frame 300" with the adjusted orientation of the blending lines 314a"-314b" to enable the vehicle 406" to be visible. For example, in the example panoramic video frame 300 shown in association with FIG. 8, the default portions 310a-310b do not display the vehicle 406 (e.g., the vehicle 406 is a missing object in the gap of the video data). By generating the adjusted video portions 310a"-310b", the vehicle 406" is visible. For example, the adjusted panoramic video frame 300" may be generated based on the same raw image (e.g., the raw image 450 shown in association with FIG. 7) as the default panoramic video frame 300 shown in association with FIG. 8. However, by adjusting the location of the blending lines, the processors 106a-106n may select different portions of the raw image 450 (e.g., different portions may be cropped out) to ensure that each of the detected objects 452-456 are visible in at least one of the adjusted portions 310a"-310c".

The vehicle 404 is shown having a vehicle portion 404b" visible in the adjusted video portion 310b" and having a vehicle portion 404c" visible in the adjusted video portion 310c". Since the vehicle 404 is at least partially visible in at least one of the adjusted video portions 310a"-310c", the decision module 158 may determine that the blending line 314b" does not need additional adjustment (e.g., the vehicle 404 is not a missing object). In some embodiments, the processors 106a-106n may be configured to adjust the orientation of the blending lines 314a"-314b" to show an entire object instead of splitting an object across the adjusted blending lines 314a"-314b", when possible.

The adjusted panoramic video frame 300" may still comprise gaps in the video data. The gaps in the video data may be located at the blending lines 314a"-314b". The processors 106a-106n may intelligently adjust the location of the gaps of the video data such that none of the detected objects 452-456 are positioned in the gaps in the output adjusted panoramic video frame 300". The processors 106a-106n may intelligently adjust the location of the gaps of the video data such that all of the detected objects 452-456 are at least partially visible in the output adjusted panoramic video frame 300".

Figure 12:
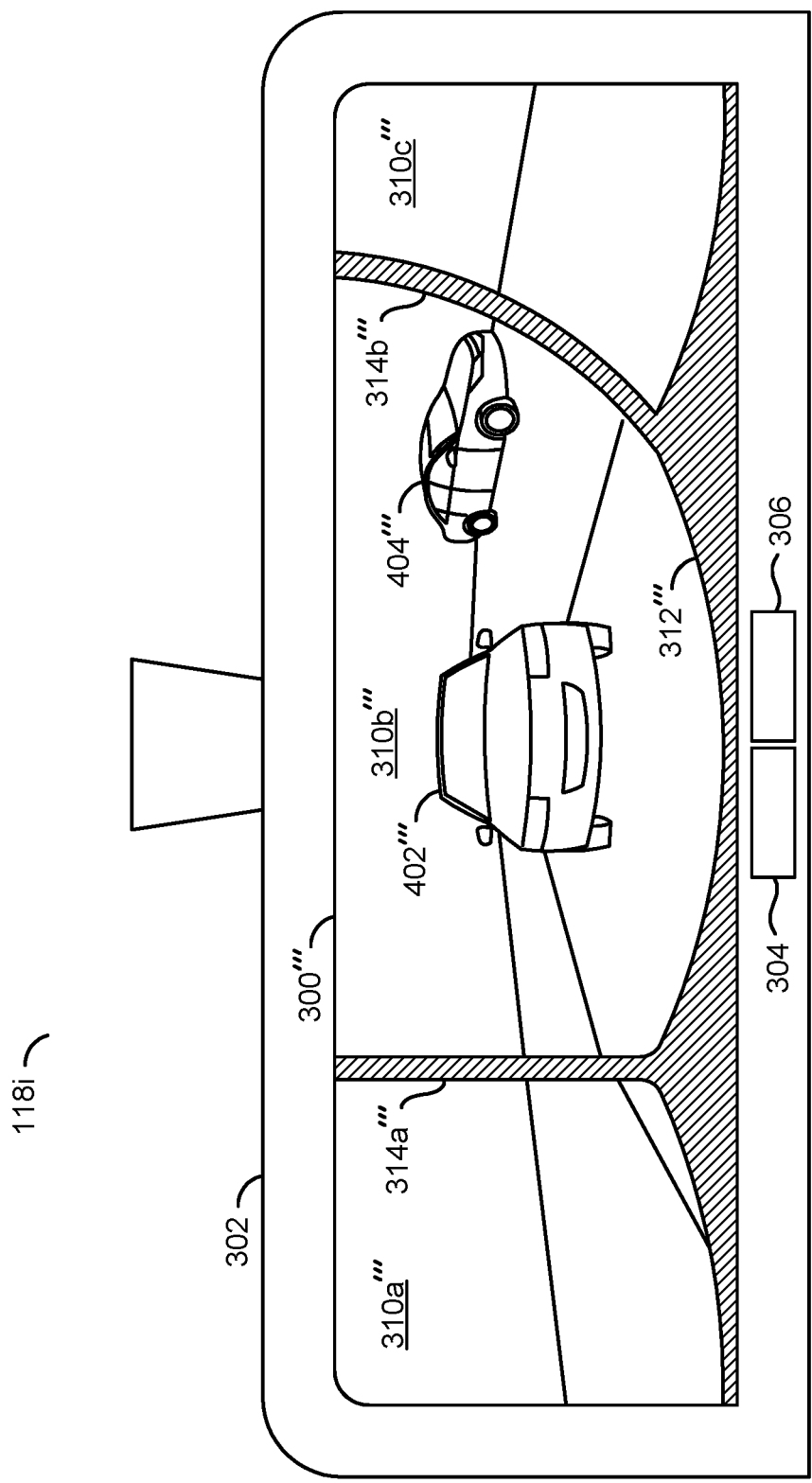
FIG. 12 is a diagram illustrating an example panoramic video frame output to an eMirror display with a curved adjusted blending line.

Referring to FIG. 12, a diagram illustrating an example panoramic video frame output to an eMirror display with a curved adjusted blending line is shown. The eMirror 118i is shown having the bezel 302, the button 304 and/or the button 306. The blending lines 314a'"-314b'" are shown in an alternate adjusted orientation.

The video data of the panoramic video frame 300'" is shown. The video data of the panoramic video frame 300'" may comprise the portion 310b'" generated from the non-rectilinear video frame 450 shown in association with FIG. 7. Portions of the video data captured by the capture device 102c, the capture device 102d and the capture device 102f may be stitched together by the processors 106a-106n. The panoramic video frame 300'" may generated as the result of the video stitching operations and the adjustment to the orientation of the blending lines 314a'"-314b'".

In the example shown, the entire vehicle 402'" and the entire vehicle 404'" are shown in the adjusted video portion 310b'". No objects are shown in the adjusted video portion 310a'". No objects are shown in the adjusted video portion 310c'".

In the example shown, the blending line 314b'" is shown having an adjusted orientation and the blending line 314a'" is shown having the default orientation. One or all of the blending lines 314a'"-314b'" may be adjusted by the processors 106a-106n. Which of the blending lines 314a'"-314b'" are adjusted may be determined in response to the presence, location and/or distance of the detected objects 452-456.

In the example shown, the adjusted blending line 314b'" is shown having a curved orientation. The adjustment to the blending lines 314a-314b may be straight lines, curved lines, have multiple segments, etc. Each of the adjusted blending lines 314a'"-314b'" may be adjusted to have different shapes (e.g., one straight line and one curved line). Each of the adjusted blending lines 314a'"-314b'" may be adjusted to have the same shape (e.g., both lines straight with a horizontal orientation). The shape of the adjusted blending lines 314a'"-314b'" may be varied according to the design criteria of a particular implementation and/or the particular driving scenario. For example, the decision module 158 may determine the shape of the adjusted blending lines 314a'"-314b'" in order to accommodate the positions of the detected objects 452-456 (e.g., to ensure the objects are not positioned in the gaps in the video data of the output panoramic video frame 300'").

The adjustment of the blending lines 314a'"-314b'" generated by the processors 106a-106n may result in the panoramic video frame 300'" comprising more of the adjusted portion 310b'" and less of the adjusted portion 310c'" compared to the size of the portions 310b-310c in the default orientation of the blending lines 314a-314b. The curved shape of the adjusted blending line 314b'" may crop out the portion 404c" of the vehicle 404 in the video portion 310c shown in association with FIG. 8. Instead of showing one portion 404b" in the video portion 310b and one portion 404c" in the video portion 310c, the curved blending line 314b" may be shaped to enable the entire vehicle 404'" to be visible in one video portion (e.g., the adjusted portion 310b'").

Adjusting the blending lines 314a'"-314b'" such that an entire object is within one of the video portions (e.g., not split across the blending lines 314a-314b and partially shown in two of the video portions 310a-310c) may prevent visual artifacts. For example, when an object is split across the blending lines 314a-314b there may be visual artifacts (e.g., size mismatch, discontinuity of an object, multiple perspectives, etc.). Generating the adjusted panoramic video frames 300'" without the visual artifacts may reduce driver distraction.

Generally, the processors 106a-106n may primarily adjust the orientation of the blending lines to ensure that each of the detected objects are shown in the output panoramic video frame (e.g., at least partially visible). Adjusting the blending lines to show a complete object using the video data from one source video frame (e.g., the raw image 450) may be performed as a secondary objective when possible. In one example, adjusting the blending lines 314a-314b to show the complete object may be performed when the adjustment does not result in causing one or more objects to be missing from the output panoramic video frame. In another example, adjusting the blending lines 314a-314b to show the complete object may be performed when at least one of the source video frame captures the complete object.

Figure 13:
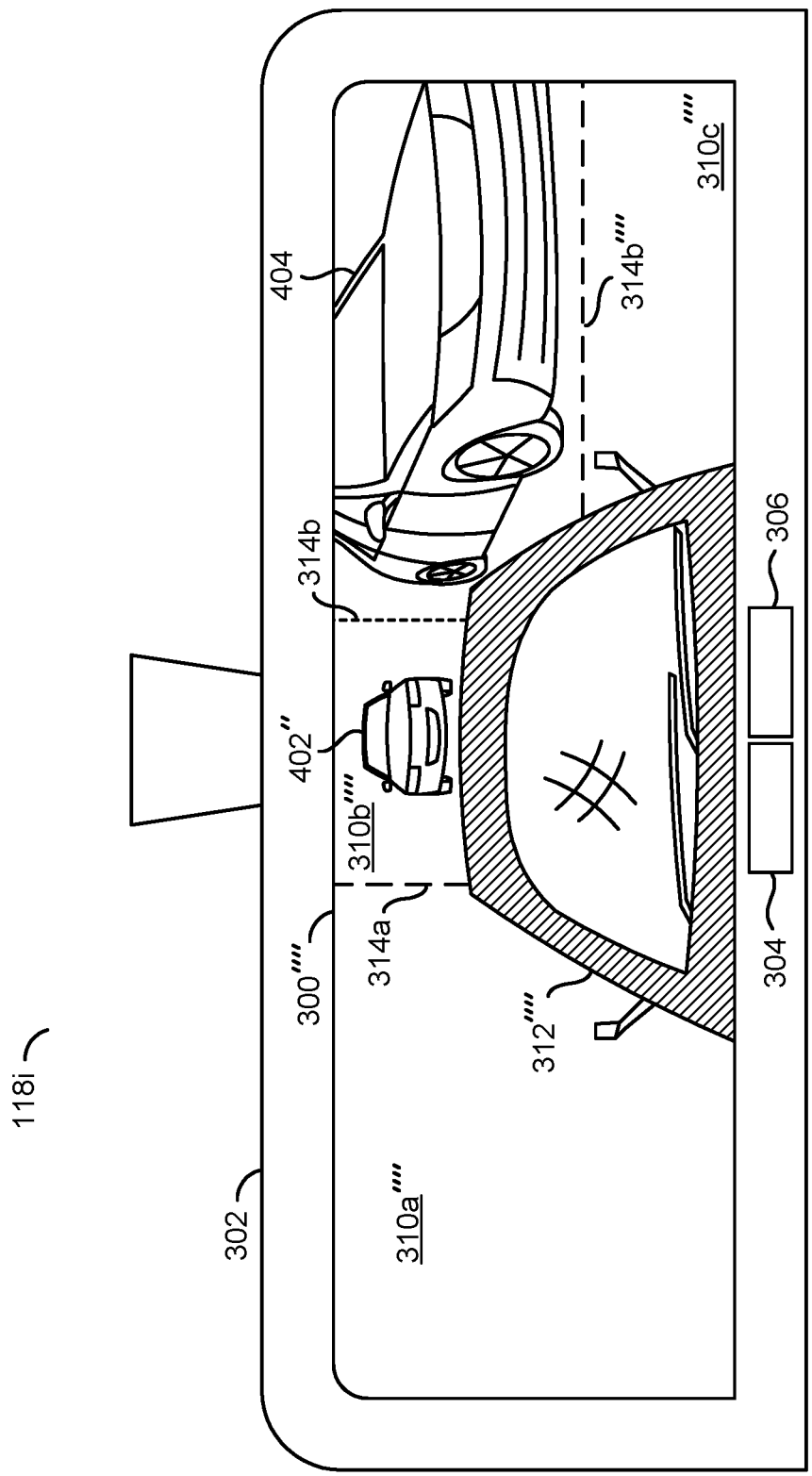
FIG. 13 is a diagram illustrating an example panoramic video frame output to an eMirror display with a vehicle overlay for an invalid area with an adjusted blending line.

Referring to FIG. 13, a diagram illustrating an example panoramic video frame output to an eMirror display with a vehicle overlay for an invalid area with an adjusted blending line is shown. The eMirror 118i is shown having the bezel 302, the button 304 and/or the button 306. The default blending lines 314a-314b are shown. The adjusted blending line 314b"" is shown.

The video data of the panoramic video frame 300"" is shown. The video data of the panoramic video frame 300"" may comprise the video data captured by the capture device 102c, the capture device 102d and the capture device 102f may be stitched together by the processors 106a-106n. The panoramic video frame 300"" may be generated as the result of the video stitching operations and the adjustment to the orientation of the blending lines 314a""-314b"".

In the example shown, the processors 106a-106n may generate the panoramic video frame 300"" by scaling the rectilinear video frames captured by the capture devices 102c, 102d and 102f down so that objects have a similar size between different camera views (e.g., to account for the difference in locations of the lenses). Scaling down the rectilinear video frames may result in a large invalid area 312"". The processors 106a-106n may generate a mask overlay for the invalid area 312"". In the example shown, the mask overlay for the invalid area 312"" may be in the shape of a vehicle to represent the spatial relationship of the ego vehicle 50 with the objects shown in the panoramic video frame 300"".

The default orientation for the blending lines 314a-314b are shown. For example, with the default orientation, the video portion 310b may be located above the invalid area 312"". The adjusted blending line 314b"" is shown. The adjusted blending line 314b"" is shown having a horizontal orientation. The horizontal orientation of the adjusted blending line 314b"" may extend the adjusted video portion 310b"" to the right side of the invalid area 312"". Extending the portion 310b"" may increase the amount of video data utilized from the raw image used to generate the portion 310b"" and decrease the amount of video data utilized from the raw image used to generate the portion 310c"". Extending the portion 310b"" by adjusting the blending line 314b"" may reveal the vehicle 404 on the output panoramic video frame 300"" (e.g., the vehicle 404 may have been a hidden object with the default orientation of the blending lines 314a-314b).

Figure 14:
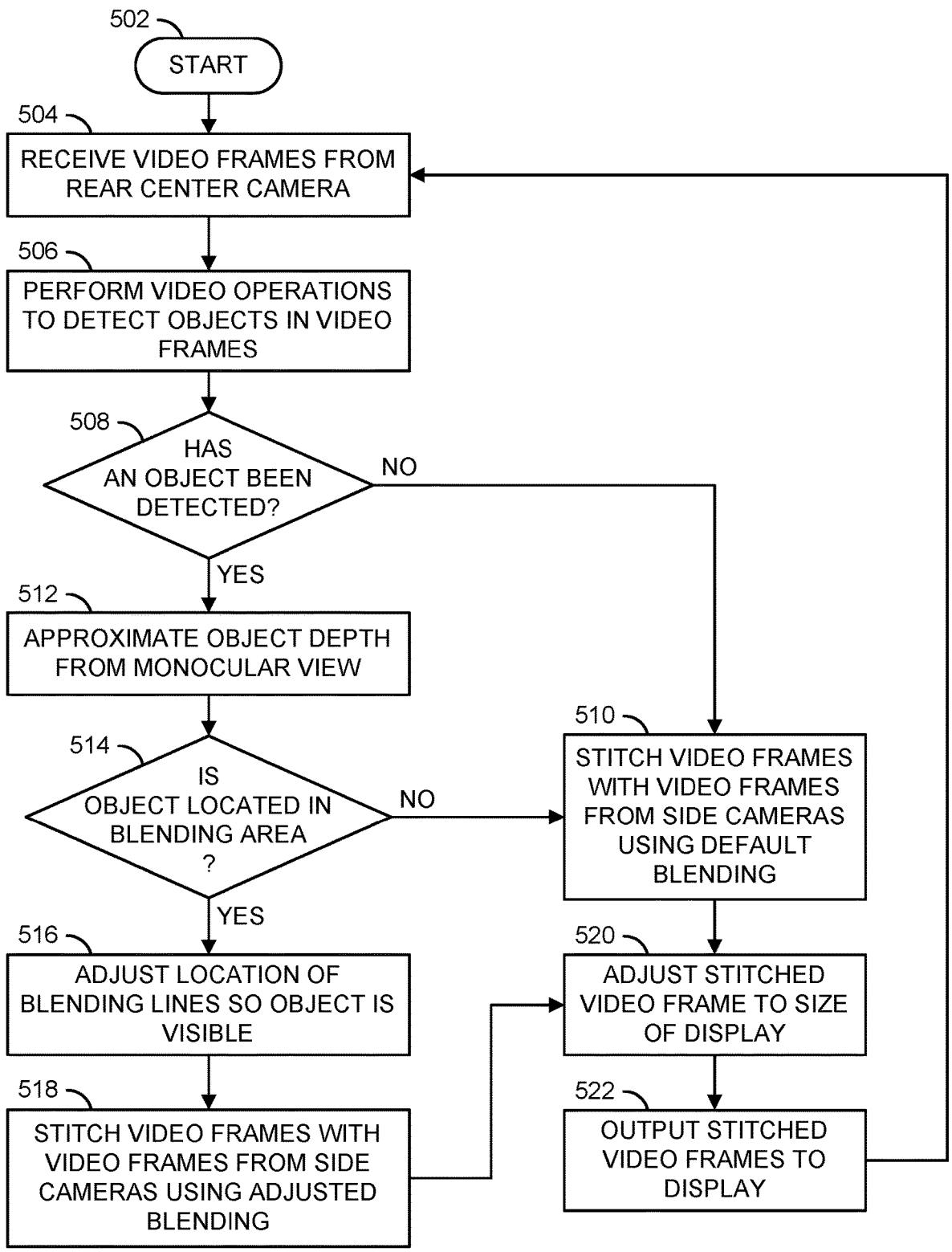
FIG. 14 is a flow diagram illustrating a method for implementing adaptable stitching for an eMirror display.

Referring to FIG. 14, a method (or process) 500 is shown. The method 500 may implement adaptable stitching for an eMirror display. The method 500 generally comprises a step (or state) 502, a step (or state) 504, a step (or state) 506, a decision step (or state) 508, a step (or state) 510, a step (or state) 512, a decision step (or state) 514, a step (or state) 516, a step (or state) 518, a step (or state) 520, and a step (or state) 522.

The step 502 may start the method 500. In the step 504, the processors 106a-106n may receive the video frames (e.g., FRAMES_C) from the rear center capture device 102c (e.g., captured by the lens 112c). Next, in the step 506, the processors 106a-106n may perform the video operations (e.g., object detection) to detect objects in the video frames FRAMES_C. Next, the method 500 may move to the decision step 508.

In the decision step 508, the CNN module 150 may determine whether an object has been detected. For example, the CNN module 150 may detect the objects 452-456 corresponding to the vehicles 402-406. If no objects have been detected, the method 500 may move to the step 510. In the step 510, the video processing pipeline 156 may perform the video stitching operations to stitch the video frames FRAMES_C with the video frames (e.g., the video frames FRAMES_D and the video frames FRAMES_F) captured using the side cameras 102d and 102f (e.g., captured using the lenses 112d and 112f) using the default orientation for the blending lines (e.g., the blending lines 314a-314b). Next, the method 500 may move to the step 520.

In the decision step 508, if the CNN module 150 determines that an object has been detected, then the method 500 may move to the step 512. In the step 512, the CNN module 150 may determine the approximate depth of the objects from the monocular view (e.g., using only the video frames FRAMES_C captured by the center rear capture device 102c). Next, the method 500 may move to the decision step 514.

In the decision step 514, the decision module 158 may determine whether the detected object(s) are located in the blending area (e.g., the gap 414). If the object is determined not to be in the gap 414, then the method 500 may move to the step 510. If the object is determined to be in the gap 414, then the method 500 may move to the step 516. In the step 516, the processors 106a-106n may adjust the location of the blending lines so that the detected object is visible (e.g., not cropped out in the output panoramic video frame 300). Next, in the step 518, the video processing pipeline 156 may perform the video stitching operations to stitch the video frames FRAMES_C with the video frames FRAMES_D and the video frames FRAMES_F (e.g., from the side capture devices 102d and 102f, respectively) using the adjusted blending lines 314a"-314b". Next, the method 500 may move to the step 520.

In the step 520, the video processing pipeline 156 may adjust the stitched video frame to fit the size of one or more of the displays 118a-118n. In an example, the video processing pipeline 156 may perform the calibration for video stitching and scale the size of the panoramic video frame 300 to a size that fits one or more of the displays 118a-118n (e.g., resizing to fit the display may not be performed dynamically to avoid causing confusion for the distances of objects displayed). In the example method 500 shown, the step 510 and the step 520 are shown as separate steps and the step 518 and the step 520 are shown as separate steps. However, in some embodiments, the stitching shown performed in the step 510 and the scaling shown performed in the step 520 may be performed at the same time. Similarly, in some embodiments, the stitching shown performed in the step 518 and the scaling shown performed in the step 520 may be performed at the same time. Next, in the step 522, the processors 106a-106n may output the panoramic video frame 300" (e.g., one or more of the signals VOUT_A-VOUT_B) to one or more of the displays 118a-118n. Next, the method 500 may return to the step 504.

Figure 15:
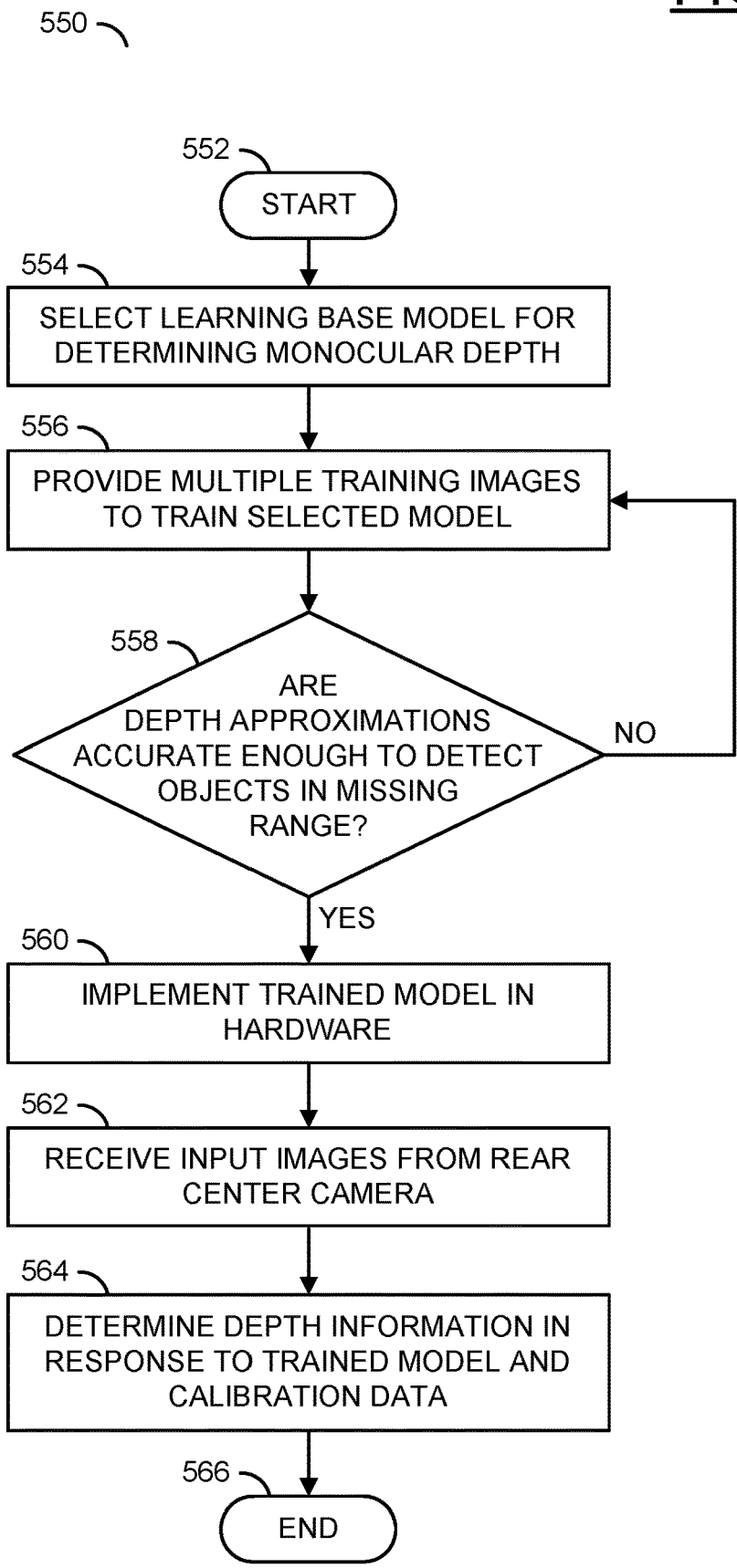
FIG. 15 is a flow diagram illustrating a method for determining depth information from a monocular view based on a training model.

Referring to FIG. 15, a method (or process) 550 is shown. The method 550 may determine depth information from a monocular view based on a training model. The method 550 generally comprises a step (or state) 552, a step (or state) 554, a step (or state) 556, a decision step (or state) 558, a step (or state) 560, a step (or state) 562, a step (or state) 564, and a step (or state) 566.

The step 552 may start the method 550. In the step 554 a learning base model may be selected for determining a monocular depth. For example, a designer (e.g., a machine learning engineer) may select from models such as BTS (Bit-to-Small), DL_61 (DORN), Pattern-Affinitive Propagation across Depth, etc. Next, in the step 556, multiple training (or reference) images 352a-352n may be provided to the selected training model 150'. Next, the method 550 may move to the decision step 558.

In the decision step 558, a designer may determine whether the depth approximations made by the CNN model 150' are accurate enough to detect objects in the missing range. If the depth approximations are not accurate enough, then the method 550 may return to the step 556. If the depth approximations are accurate enough, then the method 550 may move to the step 560. In the step 560, the trained model may be implemented in hardware. For example, a directed acyclic graph representing the trained model 150' may be provided to the processors 106a-106n to enable various hardware modules to be configured to efficiently perform the operations for implementing the trained model 150' on the processors 106a-106n. Next, the method 550 may move to the step 562.

In the step 562, the processors 106a-106n may receive input images (e.g., the signal FRAMES_C) from the rear center capture device 102c. Next, in the step 564, the CNN module 150 may determine the depth information in response to the trained model and/or calibration data used for performing the 3-in-1 eMirror video stitching (e.g., camera pose, distances between the rear camera 102c and the side cameras 102d and 102f, specifications of each of the cameras 102c, 102d and 102f, etc.). Next, the method 550 may move to the step 566. The step 566 may end the method 550.

Embodiments of the apparatus 100 may be configured to determine the depth information using a single RGB camera (e.g., the capture device 102c). The results of the neural network training may be used to determine the depth of the objects. For example, the processors 106a-106n may be configured to determine the position on the ground of the detected objects (by determining the distance to the points 462a-462b, 464a-464c and/or 466a-466c) and calibration data (e.g., data used to do the video stitching calibration for a 3-in-1 eMirror such as the camera pose, distances between the rear camera 102c and the side cameras 102d and 102f, specifications of each of the cameras 102c, 102d and 102f, etc.). Using the results from the trained neural network and the calibration data, the object distances from the ego vehicle 50 may be calculated. In some embodiments, the distance may be calculated based on the results of the depth detected by the trained neural network. In some embodiments, the distance may be calculated based on the results of the depth detected by the trained neural network and the calibration data.

Figure 16:
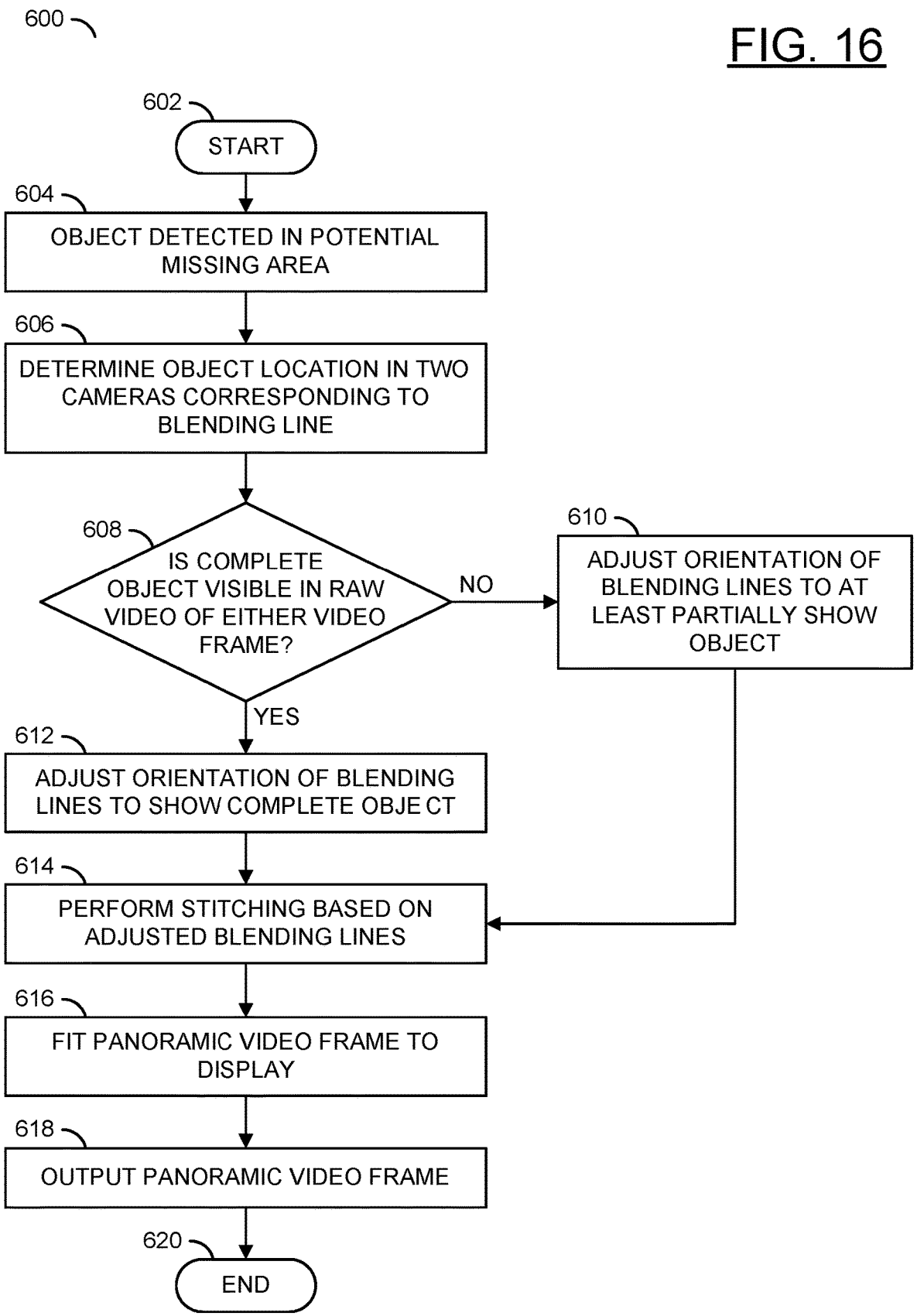
FIG. 16 is a flow diagram illustrating a method for ensuring that an object is at least partially visible in an output panoramic video frame.

Referring to FIG. 16, a method (or process) 600 is shown. The method 600 may ensure that an object is at least partially visible in an output panoramic video frame. The method 600 generally comprises a step (or state) 602, a step (or state) 604, a step (or state) 606, a decision step (or state) 608, a step (or state) 610, a step (or state) 612, a step (or state) 614, a step (or state) 616, a step (or state) 618, and a step (or state) 620.

The step 602 may start the method 600. In the step 604, the processors 106a-106n may detect an object at a distance and/or angle that may correspond to the potential missing area (e.g., the gap 414). Next, in the step 606, the processors 106a-106n may determine the object location in the two cameras that correspond to the location of the blending lines 314a-314b where the missing object has been detected. For example, if the detected vehicle 406 is determined to potentially be in the gap 414 because of the blending line 314a, then the video frames may be analyzed from the center rear camera 102c and the side camera 102d. Next, the method 600 may move to the decision step 608.

In the decision step 608, the processors 106a-106n may determine whether the object is visible in the raw video data of either of the video frames. For example, the raw video data that may normally be cropped out at the blending line 314a may be from the video frame FRAMES_C (e.g., the portion 470a) and the video frame FRAMES_D. In an example, the complete object may be a view that shows the detected object entirely (e.g., the object is not cut off at the edge of the video frame). If the complete object is not available in one of the video frames, then the method 600 may move to the step 610. In the step 610, the processors 106a-106n may adjust the orientation of the blending lines 314a-314b to at least partially show the object (e.g., so at least some of the object is visible in the output panoramic video frame). Next, the method 600 may move to the step 614.

In the decision step 608, if the complete object is visible in one of the two video frames, then the method 600 may move to the step 612. In the step 612, the processors 106a-106n may adjust the orientation of the blending lines 314a-314b to show the complete object (e.g., use more of either one of the video frames FRAMES_C or FRAMES_D to show the complete object). Next, the method 600 may move to the step 614.

In the step 614, the processors 106a-106n may perform the video stitching based on the adjusted blending lines 314a"-314b". Next, in the step 616, the processors 106a-106n may fit the panoramic video frame 300" to the size of one or more of the output video displays 118a-118n. In the step 618, the processors 106a-106n may output the adjusted panoramic video frame 300" to one or more of the displays 118a-118n. Next, the method 600 may move to the step 620. The step 620 may end the method 600.

Figure 17:
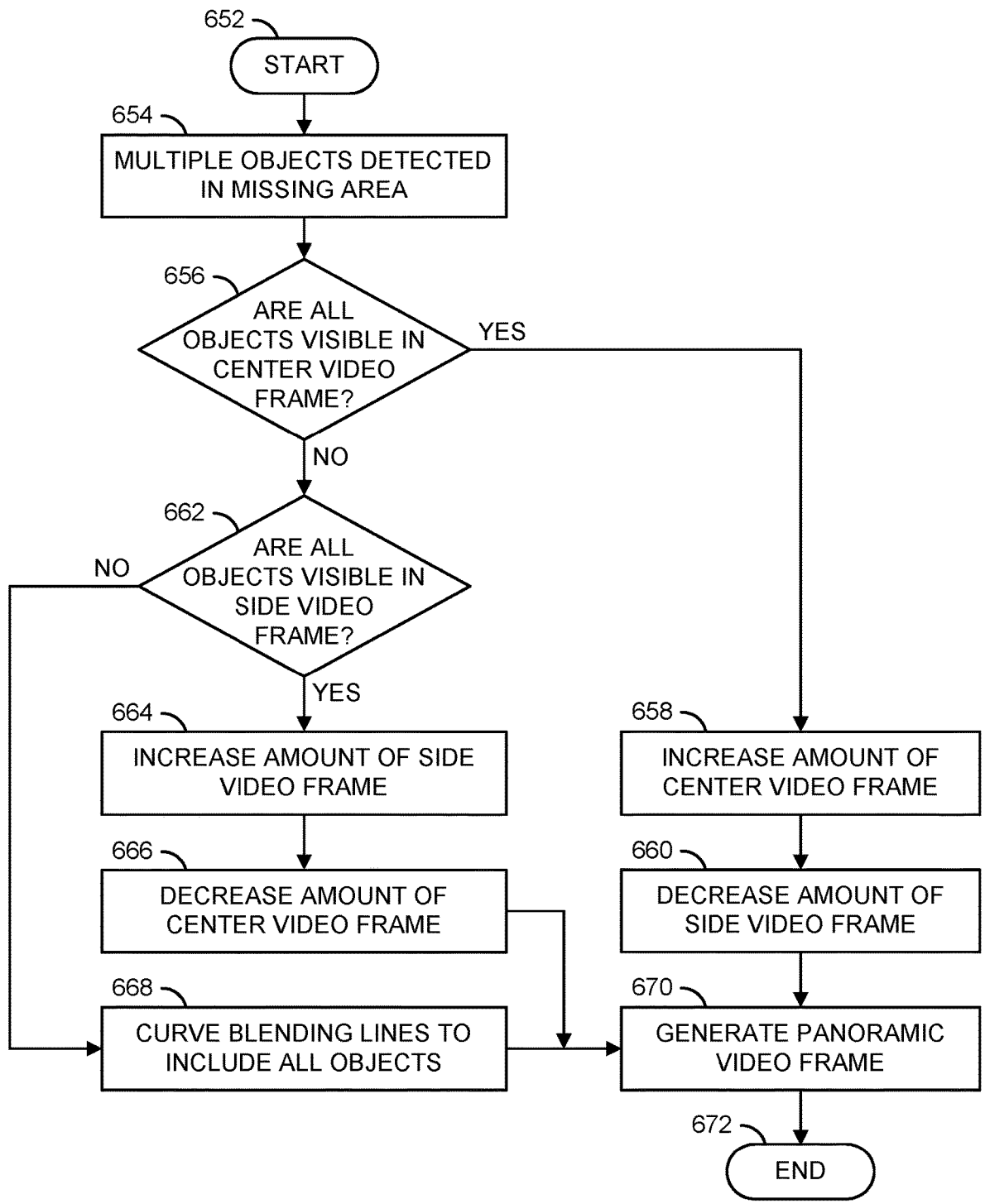
FIG. 17 is a flow diagram illustrating a method for adjusting blending lines in response to detected objects.

Referring to FIG. 17, a method (or process) 650 is shown. The method 650 may adjust blending lines in response to detected objects. The method 650 generally comprises a step (or state) 652, a step (or state) 654, a decision step (or state) 656, a step (or state) 658, a step (or state) 660, a decision step (or state) 662, a step (or state) 664, a step (or state) 666, a step (or state) 668, a step (or state) 670, and a step (or state) 672.

The step 652 may start the method 650. In the step 654, the processors 106a-106n may detect multiple objects in the missing area (e.g., in the gap 414). Next, the method 650 may move to the decision step 656. In the decision step 656, the processors 106a-106n may determine whether all of the detected objects are visible in the center video frame (e.g., the video frame FRAMES_C detected by the capture device 102c). If all the objects are visible in the center video frame, then the method 650 may move to the step 658.

In the step 658, the processors 106a-106n may increase the amount of the center video frame used in the panoramic video frame. In the step 660, the processors 106a-106n may decrease the amount of the side video frame used in the panoramic video frame. For example, the processors 106a-106n may move the blending line 314a to the left in order to increase the amount of the video portion 310b and decrease the amount of the video portion 310a. Next, the method 650 may move to the step 670.

In the decision step 656, if all the objects are not visible in the center video frame, then the method 650 may move to the decision step 662. In the decision step 662, the processors 106a-106n may determine whether all of the detected objects are visible in the side video frame. For example, the raw video data of the video frames FRAMES_D may be analyzed to determine whether all the detected objects are visible. If all the objects are visible in the side video frame, then the method 650 may move to the step 664.

In the step 664, the processors 106a-106n may increase the amount of the side video frame used in the panoramic video frame. In the step 666, the processors 106a-106n may decrease the amount of the center video frame used in the panoramic video frame. For example, the processors 106a-106n may move the blending line 314a to the right in order to increase the amount of the video portion 310a and decrease the amount of the video portion 310b. Next, the method 650 may move to the step 670.

In the decision step 662, if the processors 106a-106n determine that all of the objects are not in the side video frame, then the method 650 may move to the step 668. For example, neither the video frame FRAMES_C nor the video frame FRAMES_D are determined to show all of the detected objects. In the step 668, the processors 106a-106n may curve and/or reshape the blending lines 314a-314b so that all the objects are included. For example, the blending line 314a" may be curved to show more of the video portion 310a in some areas and more of the video portion 310b in other areas so that none of the objects end up being in the gap 414. Next, the method 650 may move to the step 670. In the step 670, the processors 106a-106n may generate the panoramic video frame 300". Next, the method 650 may move to the step 672. The step 672 may end the method 650.

The functions performed by the diagrams of FIGS. 1-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an interface configured to receive pixel data corresponding to an exterior view of a vehicle generated by a plurality of capture devices; and
    a processor configured to (a) process said pixel data arranged as video frames, (b) perform computer vision operations to detect objects in said video frames that only comprise said pixel data received from a center of said plurality of capture devices, (c) determine monocular depth information in response to said objects detected in said video frames received only from said center of said plurality of capture devices, (d) determine adjustments to blending lines in response to a comparison of said monocular depth information to a missing object range for stitching said pixel data corresponding to said center of said plurality of capture devices to both (a) said pixel data from a left of said plurality of capture devices and (b) said pixel data from a right of said plurality of capture devices, (e) perform video stitching operations on said video frames corresponding to said plurality of capture devices based on said blending lines and (f) generate panoramic video frames in response to said video stitching operations, wherein
    (a) said blending lines cause said missing object range in a field of view of said panoramic video frames,
    (b) said blending lines are determined to prevent said objects from being in said missing object range in said field of view, and
    (c) said panoramic video frames are generated to fit a size of a display.

2. The apparatus according to claim 1, wherein said objects are not visible on said display when said objects are in said missing object range in said field of view of said panoramic video frames.

3. The apparatus according to claim 1, wherein (i) said objects are not visible on said display before said blending lines are adjusted and (ii) said objects are at least partially visible on said display after said blending lines are adjusted in response to said comparison of said monocular depth information to said missing object range.

4. The apparatus according to claim 1, wherein said monocular depth information comprises a distance and an angle of said objects from said center of said plurality of capture devices.

5. The apparatus according to claim 4, wherein said monocular depth information is determined from a depth map generated by a convolutional neural network without input from an external sensor.

6. The apparatus according to claim 1, wherein said monocular depth information is generated by performing said computer vision operations using a convolutional neural network.

7. The apparatus according to claim 4, wherein said processor is configured to determine a location of said objects based on said distance and said angle in response to (a) a pose of said center of said plurality of capture devices and (b) comparing said monocular depth information to said pose of said center of said plurality of capture devices.

8. The apparatus according to claim 4, wherein said monocular depth information is determined from (i) performing image analysis with a convolutional neural network to determine a position on the ground of said objects detected in said video frames and (ii) calibration data used for video stitching.

9. The apparatus according to claim 1, wherein (i) said blending lines have a default configuration and (ii) said processor adjusts an orientation of said blending lines from said default configuration to an adjusted configuration in response to said monocular depth information.

10. The apparatus according to claim 9, wherein (i) said panoramic video frames each comprise three of said video frames stitched together, (ii) said default configuration comprises two of said blending lines in a vertical orientation each separating two of said three of said video frames and (iii) said video frames corresponding to said center of said plurality of capture devices are presented in between said blending lines.

11. The apparatus according to claim 10, wherein (i) said display implements an electronic mirror configured to provide a rear view from said vehicle and (ii) each of said three of said video frames is captured by a respective one of said plurality of capture devices.

12. The apparatus according to claim 9, wherein (i) portions of said video frames corresponding to said missing object range in said field of view are provided by a raw image of said video frames corresponding to said center of said capture devices, (ii) said portions of said video frames are cropped from said panoramic video frames in said default configuration and (iii) said adjusted configuration of said blending lines enables said portions of said video frames corresponding to said center of said capture devices to be output in said panoramic video frames in said adjusted configuration.

13. The apparatus according to claim 1, wherein said monocular depth information is sufficient to determine whether said objects are within said missing object range without performing stereo vision calculations using said pixel data from either said left of said plurality of capture devices or said right of said plurality of capture devices.

14. The apparatus according to claim 1, wherein (a) said blending lines correspond to locations of said panoramic video frames where said video stitching operations join more than one of said video frames together, (b) said blending lines conceal cropped out portions of said video frames that are joined together to prevent visual distortions at said locations and (c) preventing said visual distortions results in said objects not being visible while in said missing object range.

15. The apparatus according to claim 14, wherein said visual distortions comprise double images of said objects.

16. The apparatus according to claim 1, wherein said blending lines are at least one of (i) straight lines and (ii) curved lines.

17. The apparatus according to claim 1, wherein said blending lines are determined to provide a single complete view of said objects.

18. The apparatus according to claim 1, wherein determining said monocular depth information in response to said computer vision operations performed by a convolutional neural network on said video frames corresponding to said center of said plurality of capture devices reduces a computational cost of said processor compared to determining 3D positioning of said objects using stereo images from more than one of said plurality of capture devices.

19. The apparatus according to claim 1, wherein (i) said computer vision operations are configured to detect said objects by performing feature extraction based on weight values for each of a plurality of visual features that are associated with said objects extracted from said video frames and (ii) said weight values are determined in response to an analysis of training data by said processor prior to said feature extraction.

20. The apparatus according to claim 1, said computer vision operations are further performed by (i) applying a feature detection window to each of a plurality of layers extracted from said video frames and (ii) a convolution operation using matrix multiplication of said plurality of layers defined by said feature detection window.

* * * * *